United States Patent
Bang

(10) Patent No.: US 9,367,234 B2
(45) Date of Patent: Jun. 14, 2016

(54) IMAGE DISPLAY DEVICE AND CONTROLLING METHOD THEREOF

(71) Applicant: LG Electronics Inc., Seoul (KR)

(72) Inventor: Youseok Bang, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 413 days.

(21) Appl. No.: 14/148,583

(22) Filed: Jan. 6, 2014

(65) Prior Publication Data

US 2014/0195957 A1 Jul. 10, 2014

Related U.S. Application Data

(60) Provisional application No. 61/749,696, filed on Jan. 7, 2013.

(30) Foreign Application Priority Data

Dec. 3, 2013 (KR) .......................... 10-2013-0149431

(51) Int. Cl.
| | | |
|---|---|---|
| *G06F 3/048* | (2013.01) | |
| *G06F 3/0488* | (2013.01) | |
| *G06F 3/0481* | (2013.01) | |
| *G06F 3/0482* | (2013.01) | |
| *G06F 3/0486* | (2013.01) | |

(52) U.S. Cl.
CPC ............ *G06F 3/0488* (2013.01); *G06F 3/0481* (2013.01); *G06F 3/0482* (2013.01); *G06F 3/0486* (2013.01); *G06F 3/04812* (2013.01); *G06F 3/04883* (2013.01); *G06F 3/04886* (2013.01)

(58) Field of Classification Search
CPC ... G06F 3/0488; G06F 3/0481; G06F 3/0482; G06F 3/0486
USPC .......................................................... 715/773
See application file for complete search history.

(56) References Cited

U.S. PATENT DOCUMENTS

| | | | | |
|---|---|---|---|---|
| 6,404,443 | B1 * | 6/2002 | Westerman | G06F 3/0481 715/776 |
| 7,478,326 | B2 * | 1/2009 | Holecek | G06F 3/0481 348/E5.104 |
| 8,281,241 | B2 * | 10/2012 | Tokkonen | G06F 3/038 715/708 |
| 8,539,385 | B2 * | 9/2013 | Capela | G06F 3/0488 715/764 |
| 9,213,477 | B2 * | 12/2015 | Singhal | G06F 3/0488 |
| 9,213,482 | B2 * | 12/2015 | Mai | G06F 3/04883 |
| 2002/0011990 | A1 * | 1/2002 | Anwar | G06F 3/1203 345/173 |
| 2002/0084991 | A1 * | 7/2002 | Harrison | G06F 3/0488 345/173 |

(Continued)

*Primary Examiner* — David Phantana Angkool
(74) *Attorney, Agent, or Firm* — Birch, Stewart, Kolasch & Birch, LLP

(57) ABSTRACT

An image display device including a touchscreen display configured to display information; a controller configured to display a touch input window with a predetermined transparency while maintaining the information displayed on the touchscreen display based on a received request, the touch input window including a pad region for controlling a pointer displayed on the touchscreen display, move the pointer displayed on the touchscreen display in accordance with a touch movement on the mouse pad region, select and execute an application corresponding to a display object displayed on the touchscreen display when the pointer is displayed on the display object and an execute command is received, and select and execute the application corresponding to the display object when the pointer is not displayed on the display object and a touch direct input of the display object is received.

20 Claims, 24 Drawing Sheets

(56) References Cited

U.S. PATENT DOCUMENTS

| | | | | |
|---|---|---|---|---|
| 2007/0083825 A1* | 4/2007 | Chaudhri | ............. | G06F 3/0481 715/788 |
| 2013/0321287 A1* | 12/2013 | Adamson | ............. | G06F 3/041 345/173 |
| 2014/0137035 A1* | 5/2014 | Yentur | ............. | G06F 3/04883 715/786 |

* cited by examiner

FIG. 5C
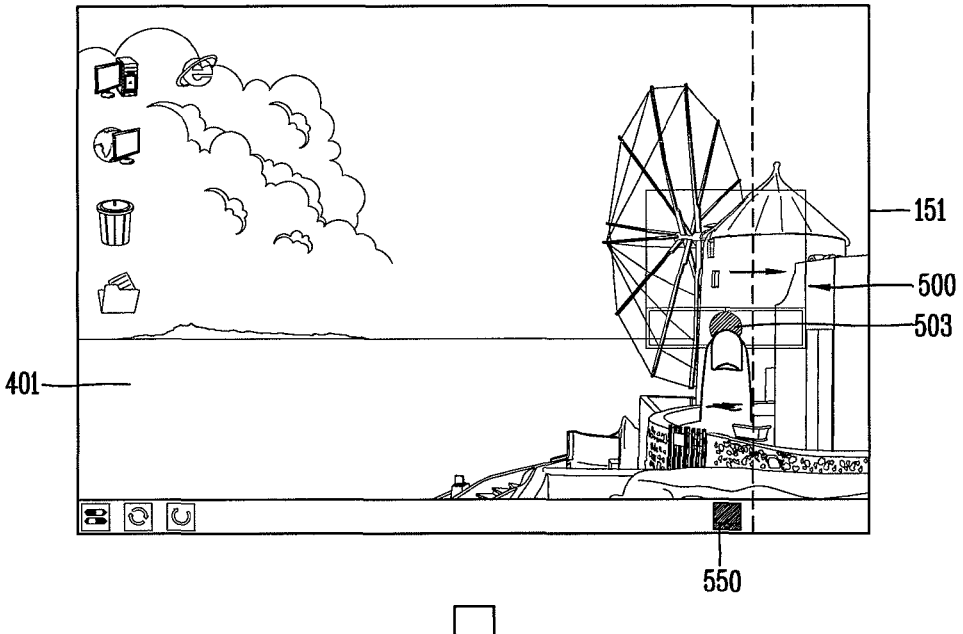
(a)
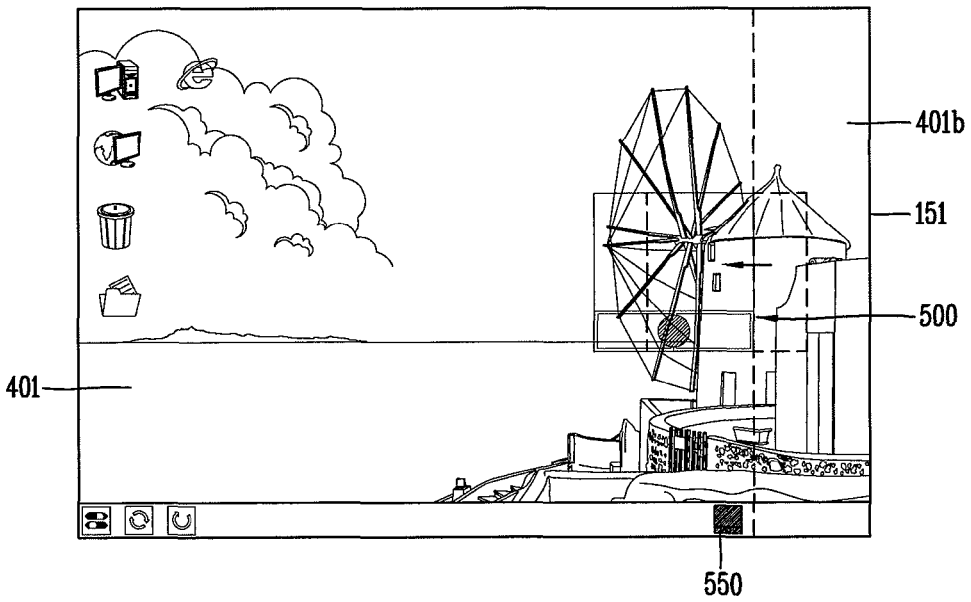
(b)

FIG. 7A
(a)
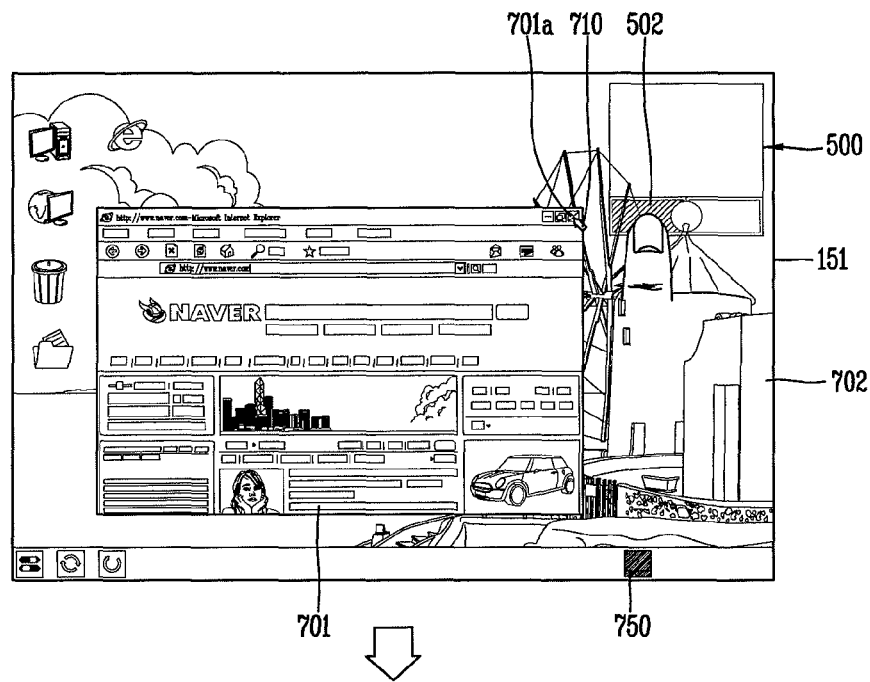
(b)
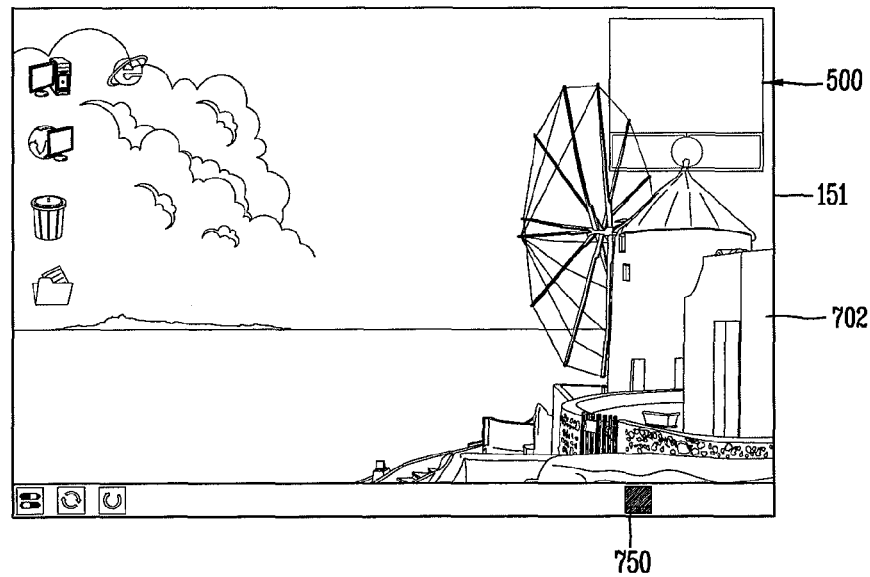

IMAGE DISPLAY DEVICE AND CONTROLLING METHOD THEREOF

CROSS-REFERENCE TO RELATED APPLICATION

Pursuant to 35 U.S.C. §119(a), this application claims the benefit of earlier filing date and right of priority to U.S. Provisional Application No. 61/749,696, filed on Jan. 7, 2013, and Korean Patent Application No. 10-2013-0149431 filed on Dec. 3, 2013 the contents of which is incorporated by reference herein in its entirety.

BACKGROUND OF THE INVENTION

1. Field of the Invention

The present invention relates to an image display device and a control method thereof, and more particularly, to an image display device allowing a touch input on a display, and a control method thereof 2. Description of the Related Art An image display device outputs image and sounds that can be viewed and listened to by the user. Such an image display device includes all image display devices such as a portable phone, a smart phone, a laptop computer, a digital broadcast terminal, a personal digital assistant (PDA), a portable multimedia player (PMP), a navigator, and the like, and stationary terminals such as a digital TV, a desktop computer and the like.

A user can also view an image corresponding to a composite function such as capturing still images or moving images, playing music or video files, gaming, receiving broadcast and the like through an image display device. Furthermore, the image display device includes a user interface (UI) environment allowing the user to easily and conveniently retrieve or select various functions. The user can also use a keyboard or mouse, for example.

However, the image display device is developed in a lighter and simpler design form and the miniaturization and mobility thereof is gradually emphasized. Therefore, a physical space for providing a separate input device such as the keyboard or mouse are further restricted.

SUMMARY OF THE INVENTION

Thus, one aspect of the embodiments of the present invention is to provide an image display device and a control method thereof in which a virtual input device without occupying a physical space is implemented to be displayed on a display unit.

Another aspect of the embodiments of the present invention is to provide an image display device and a control method thereof in which a virtual input device is implemented to be displayed at a user's desired location without hiding a screen displayed on the display unit.

Still another aspect of the embodiments of the present invention is to provide an image display device and a control method thereof in which a pointer-based input can be continuously switched with no additional operation using a direct touch input to the display unit and a virtual input device, and only a direct touch input to the display unit can be performed according to a specific condition.

To achieve these and other aspects, the present invention provides an image display device according to an embodiment of the present invention may include a display unit configured to enable a touch input; a sensing unit configured to sense a touch input applied to the display unit; and a controller configured to control the display unit to show a touch input window having a predetermined transparency while maintaining the display status of an object displayed on the display unit upon receiving a request of the touch input window, wherein the controller controls to display a pointer moving in proportion to the movement of a first touch input in one region of the display unit, and point a specific object with the pointer so as to enter the corresponding control command when the first touch input is sensed in a region displayed with the touch input window, and controls to allow the pointer to disappear and apply a function corresponding to the second touch input to an object when a second touch input is sensed on the object displayed in a region out of the touch input window.

According to an embodiment, the controller may control the display unit to move the touch input window along a dragged touch input in response to the touch applied to a preset region being dragged in the touch input window.

According to an embodiment, when at least part of the touch input window moving along the dragged touch input is sensed to be out of a preset boundary region of the display unit, the controller may control the display unit such that the touch input window is located there within based on-the preset boundary region.

As an example associated with the present invention, a display corresponding to a first mode and a second mode selectively activated according to a touch may be displayed in the preset region, and the controller may control the touch input window and the pointer to disappear from the display unit when a preset touch is sensed in a background screen region out of the touch input window in the first mode, and control the display of the touch input window and the pointer to be maintained when a preset touch is sensed in a background screen region out of the touch input window in the second mode.

According to an embodiment, the controller may control the touch input window and the pointer to be displayed at locations that have been displayed prior to disappearing from the display unit, respectively, upon receiving a request of the touch input window.

According to an embodiment, the touch input window may include at least a first and a second region, and the controller may execute a double click function to an object indicated by the pointer when a start point of the first touch input is performed in the first region, and display a menu item for executing at least one function associated with a region displayed with the pointer when a start point of the first touch input is performed in the second region.

According to an embodiment, the controller may display a display a region to which a start point of the first touch input is applied between the first and the second region, which is visually distinguished from the other region.

According to an embodiment, when a region at which a start point of the first touch input is located is different from a region at which an end point of the first touch input is located, the controller may control to execute only a function corresponding to the region at which a start point of the first touch input is located.

According to an embodiment, the controller may display the first and the second region to be separated from each other at a preset location of the display unit upon receiving a first input signal, and control to display a pointer moving along the movement of the drag touch input to be displayed in one region of the display unit in response to a drag touch input being sensed in at least one of the first and the second region, and control the display unit to contain the first and the second region within one touch input window upon receiving a second input signal.

According to an embodiment, the controller may control to switch a function corresponding to the first touch input executed in the first and the second region based on a user's setting.

According to an embodiment, the display unit may display the object in a direction determined according to the sensed inclination of the body, and the controller may control the display direction of the first and the second region to be matched to the determined direction.

According to an embodiment, the controller may control the display unit to change the size of the touch input window based on the user's input.

According to an embodiment, the controller may control the display unit to display the pointer at a position where a third touch input is sensed in response to the third touch input being sensed on the display unit when the size of the touch input window is matched to the size of the display unit, and display a pointer moving along the movement of a first touch input in one region of the display unit in response to the first touch input being sensed on the display unit.

According to an embodiment, the controller may control to maintain the display status of a pointer moving along a first touch even when the first touch started from a region displayed with the touch input window is out of the region displayed with the touch input window, and maintain the display status of an object moving along a second touch even when the second touch applied to an object displayed in a region out of the touch input window enters the region displayed with the touch input window.

According to an embodiment, the controller may display an indicator icon for adjusting the transparency of the touch input window in response to a touch input being applied to a preset region of the touch input window, and adjust the transparency of the touch input window according to the manipulation of the indicator icon.

According to an embodiment, the controller may control at least one control key associated with a screen displayed on the display unit to be displayed within the touch input window in response to a preset touch being applied to the touch input window.

According to an embodiment, when a window screen corresponding to the execution of a first application is popped up. When the touch input window is displayed, the controller may deactivate a touch input to a region overlapped with the popped up window screen in the touch input window.

According to an embodiment, the controller may determine whether or not to display the touch input window and whether or not to activate a touch input to a region overlapped with the window screen in the touch input window based on a preset priority.

According to an embodiment, the controller may control to display at least one of a sound, a vibration and a highlighting effect corresponding to the first touch input in response to the first touch input being sensed in a region displayed with the touch input window.

A method of controlling an image display device according to an embodiment of the present invention may include receiving a request of a touch input window; displaying a touch input window having a predetermined transparency on a screen while maintaining the display status of an object displayed on the display unit in response to the received request; displaying a pointer moving in proportion to the movement of a first touch input in one region of the display unit, and pointing a specific object with the pointer to execute the corresponding control command when the first touch input is sensed in a region displayed with the touch input window; and allowing the pointer to disappear and applying a function corresponding to a second touch input to the object when the second touch input is sensed on an object displayed in a region out of the touch input window.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 5A through 5C are conceptual views illustrating a method of moving a virtual input device displayed on the display unit according to an embodiment of the present invention;

FIGS. 7A through 7D are conceptual views illustrating a method of executing different functions in a virtual input device displayed on the display unit according to an embodiment of the present invention;

DETAILED DESCRIPTION OF THE INVENTION

Figure 1:
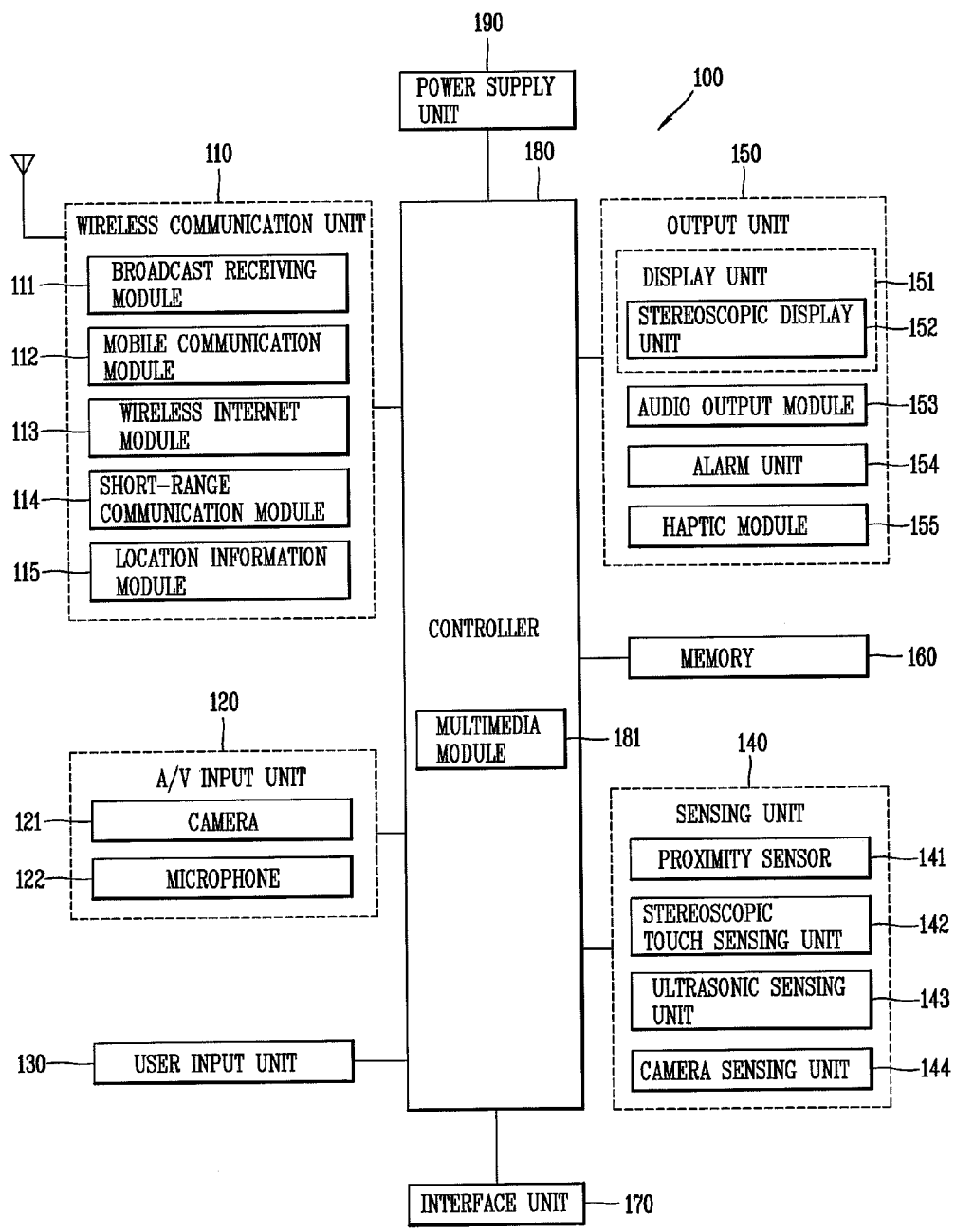
FIG. 1 is a block diagram illustrating a block diagram of an image display device according to an embodiment of the present invention.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, the accompanying drawings are merely illustrated to easily explain the concept of the invention, and therefore, they should not be construed to limit the technological concept disclosed herein by the accompanying drawings.

An image display device disclosed herein may include a portable phone, a smart phone, a laptop computer, a digital broadcast terminal, a personal digital assistant (PDA), a mobile multimedia player (PMP), a navigation, a slate PC, a tablet PC, an ultrabook, and the like. However, the present invention is applicable to a stationary terminal such as a digital TV, a desktop computer, and the like, excluding constituent elements particularly configured for mobile purposes.

FIG. 1 is a block diagram illustrating an image display device 100 according to an embodiment disclosed in the present invention. The image display device 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the image display device may be implemented with greater or less number of elements than those illustrated elements.

The wireless communication unit 110 may include one or more modules allowing radio communication between the image display device 100 and a wireless communication system, or allowing radio communication between the image display device 100 and a network in which the image display device 100 is located. For example, in FIG. 1, the wireless communication unit 110 includes at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel. The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Further, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Further, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the image display device 100. Further, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Further, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the image display device, and there is a Global Positioning Module (GPS) module or Wireless Fidelity (Wi-Fi) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the image display device. The user input unit 130 may be configured by including a keypad, a dome switch, a touch pad (pressure/capacitance), a jog wheel, a jog switch, and the like.

The sensing unit 140 detects a current status of the image display device 100 such as an opened or closed configuration of the image display device 100, a location of the image display device 100, a presence or absence of user contact with the image display device 100, an orientation of the image display device 100, an acceleration/deceleration of the image display device 100, and the like, so as to generate a sensing signal for controlling the operation of the image display device 100. For example, when the image display device 100 is a slide phone type, the sensing unit 140 may sense whether a sliding portion of the image display device is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the image display device 100. For example, when the image display device 100 is in a phone call mode, the display unit 151 may display a User Interface (UI) or a Graphic User Interface (GUI) associated with a call. When the image display device 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

Two or more display units 151 may be implemented according to a configured aspect of the image display device 100. For instance, a plurality of the display units 151 may be arranged on one surface to be spaced apart from or integrated with each other, or may be arranged on different surfaces in the image display device 100.

Furthermore, the display unit 151 may be configured with a stereoscopic display unit 152 for displaying a stereoscopic image.

Further, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Further, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

In addition, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Further, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 can sense which region of the display unit 151 has been touched.

Referring to FIG. 1, a proximity sensor 141 may be arranged at an inner region of the image display device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this instance, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (for example, proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, an ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The image display device may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound. For example, the ultrasound sensing unit 143 may be configured with an optical sensor and a plurality of ultrasound sensors. The optical sensor may be formed to sense light, and the ultrasound sensor may be formed to sense ultrasound waves. Because light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor. For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

In another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the image display device 100 (e.g., sound alarming a call received or a message received, and so on). The audio output module 153 may include a receiver, a speaker, a buzzer, and so on.

The alarm 154 outputs signals notifying occurrence of events from the image display device 100. The events occurring from the image display device 100 may include call received, message received, key signal input, touch input, and so on. The alarm 154 may output not only video or audio signals, but also other types of signals such as signals notifying occurrence of events in a vibration manner. Since the video or audio signals can be output through the display unit

151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the image display device 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the image display device 100 may operate in association with a web storage which performs the storage function of the memory 160 on the Internet.

The interface unit 170 may generally be implemented to interface the image display device with external devices connected to the image display device 100. The interface unit 170 may allow a data reception from an external device, a power delivery to each component in the image display device 100, or a data transmission from the image display device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

In addition, the identification module may be configured as a chip for storing various information required to authenticate an authority to use the image display device 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the terminal 100 via a port.

Furthermore, the interface unit 170 may serve as a path for power to be supplied from an external cradle to the image display device 100 when the image display device 100 is connected to the external cradle or as a path for transferring various command signals input from the cradle by a user to the image display device 100. Such various command signals or power input from the cradle may operate as signals for recognizing that the image display device 100 has accurately been mounted to the cradle.

The controller 180 typically controls the overall operations of the image display device 100. For example, the controller 180 performs the control and processing associated with telephony calls, data communications, video calls, and the like. The controller 180 can include a multimedia module 181 which provides multimedia playback. The multimedia module 181 may be configured as part of the controller 180 or as a separate component.

The power supply unit 190 receives external and internal power to provide power required for various components under the control of the controller 180.

Various embodiments described herein may be implemented in a computer or similar device readable medium using software, hardware, or any combination thereof For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself For a software implementation, the embodiments such as procedures or functions described in the present invention may be implemented with separate software modules. Each of the software modules may perform at least one function or operation described in the present invention. Software codes can be implemented by a software application written in any suitable programming language. The software codes may be stored in the memory 160 and executed by the controller 180.

In addition, a touch input device applied to the image display device 100 according to an embodiment of the present invention is configured to have a predetermined transparency so as to maintain the display status of an object displayed on the display unit 151. When the touch input device is displayed on the display unit 151, the sensing unit 140 senses a touch applied to the displayed touch input device to be distinguished from a touch applied to a region out of the touch input device.

The controller 180 displays a pointer moving in proportion to the movement of a first touch input on the display unit, and points a specific object displayed on the display unit with the pointer to execute the corresponding control command in response to the first touch input being sensed in a region displayed with the touch input window. Furthermore, the controller 180 allows the pointer to disappear and applies a function corresponding to the second touch input to an object when a second touch input is sensed on the object displayed in a region out of the touch input window.

Hereinafter, referring to FIG. 2, a laptop computer external device will be described as an example for the image display device 100 to which a virtual touch input device according to an embodiment of the present invention is applied.

Figure 2:
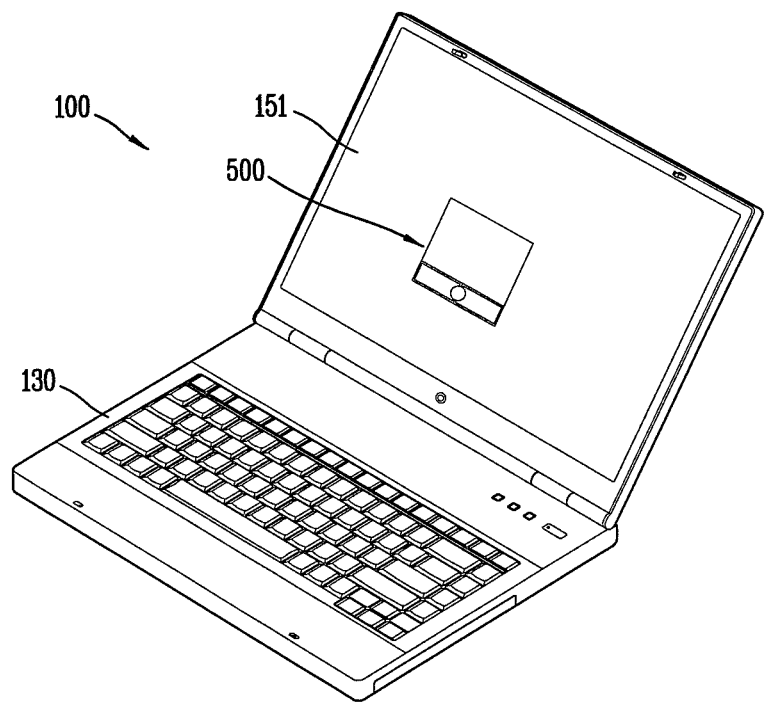
FIG. 2 is a view illustrating a laptop computer as an example of an image display device according to an embodiment of the present invention.

Referring to FIG. 2, a virtual touch input device 500 is displayed in one region on the display unit 151 of the image display device 100, instead of a pointing device such as a mouse. According to an embodiment of the present invention, the virtual touch input device 500 may execute the same function as that of a mouse pad in response to the user's touch input. For example, when a touch is applied to the virtual touch input device 500 in one region of the display unit 151, a mouse pointer may be displayed thereon. Furthermore, the user can place his or her hand or a stylus pen on the virtual touch input device 500 displayed on the display unit 151 to move it in his or her desired direction such as upward, downward, left, right, diagonal direction or the like, thereby controlling the mouse pointer.

Specifically, the image display device 100 may produce the X, Y coordinates of the mouse pointer from movement information corresponding to a touch input applied to the virtual touch input device 500. Furthermore, the image display device 100 may display a mouse pointer according to the produced X, Y coordinates. Furthermore, for the image display device 100, the shape (or size), moving direction, moving speed and moving distance of a mouse pointer may be determined based on the pressure, direction, speed and frequency of a touch input applied to the virtual touch input device 500. Further, the mouse pointer may be formed of a shape such as a point, a cursor, a prompt, an outline, and the like, for example, in addition to an arrow shape.

In addition, the virtual touch input device 500 has a predetermined transparency not to hide the display of various objects displayed on the display unit 151 and not to hinder an input to the objects. As a result, it is possible to overcome both the spatial limit and screen limit at the same time due to the provision of an input device.

Furthermore, the virtual touch input device 500 may be moved to a user's desired location within the display unit 151, and the size thereof may be appropriately changed for the user. Accordingly, the user can place it on his or her convenient location to perform an input, and the pointer and the virtual touch input device 500 for controlling the mouse pointer are separated from each other, thereby preventing an object to be pointed by the user's hand or stylus pen from being hidden.

Meanwhile, for the laptop computer 100 illustrated in FIG. 2, a keyboard input device is illustrated as the user input unit 130, for example, but a virtual keyboard may be also implemented to be displayed on the display unit 151 instead of the keyboard input device.

Hereinafter, an operating method of the image display device 100 in which a virtual input device is displayed according to an embodiment of the present invention will be described in more detail with reference to FIGS. 3, 4A through 4E.

Figure 3:
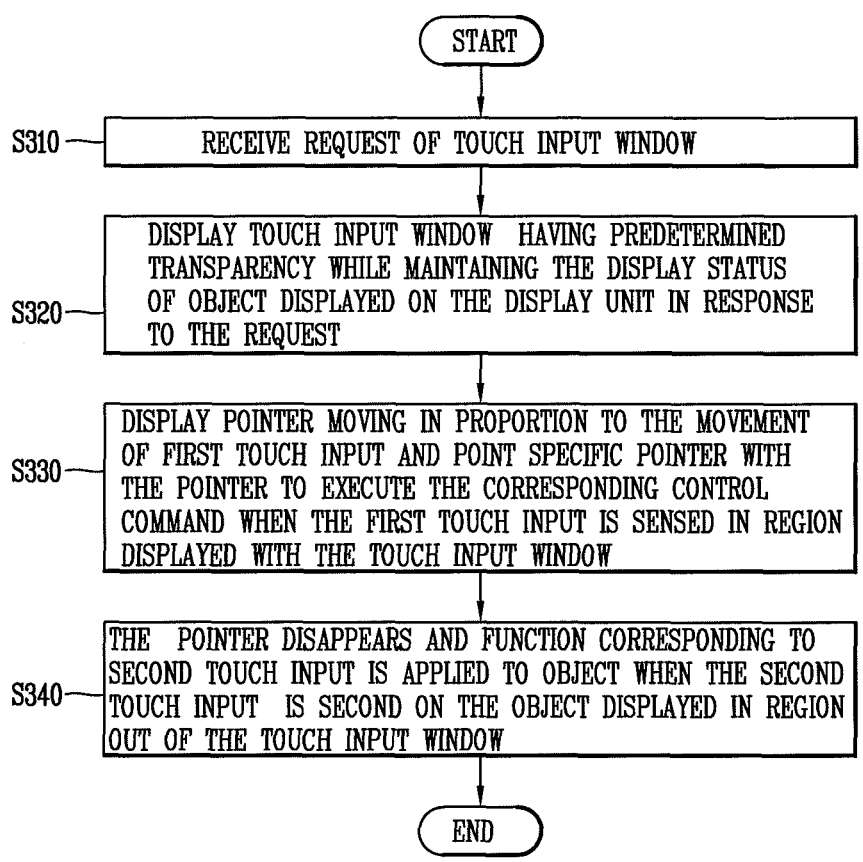
FIG. 3 is a flow chart illustrating a method of operating an image display device according to an embodiment of the present invention.

FIG. 3 is a flow chart illustrating a method of operating an image display device according to an embodiment of the present invention, and FIGS. 4A through 4E are conceptual views illustrating a method of controlling a screen using a virtual input device displayed on the display unit according to an embodiment of the present invention.

First, the controller 180 receives a request of a touch input window according to a preset user's input (S310). Further, an input signal corresponding to a request of the touch input window may be implemented in various ways. For example, the user can touch an icon or soft key corresponding to the touch input window displayed in one region of the display unit 151, for example, a lower end region thereof, or push a specific key of the user input unit 130 to enter a control command for executing an on/off function of the touch input window. In another example, a preset voice command (for example, "mouse pad") may be recognized as a request of the touch input window.

Subsequently, the image display device 100 displays a touch input window having a predetermined transparency on the display unit 151 while maintaining the display status of an object displayed on the display unit 151 of the image display device 100 in response to the received request (S320).

Further, the predetermined transparency may be a preset value. At least part of the touch input window may have a transparency value different from that of the other region. For example, the boundary region of the touch input window may be displayed with a transparency lower than a preset transparency value, and the other region may be set to have the preset transparency value. Accordingly, the user can immediately recognize the display or non-display and display location of the touch input window.

Figure 4A:
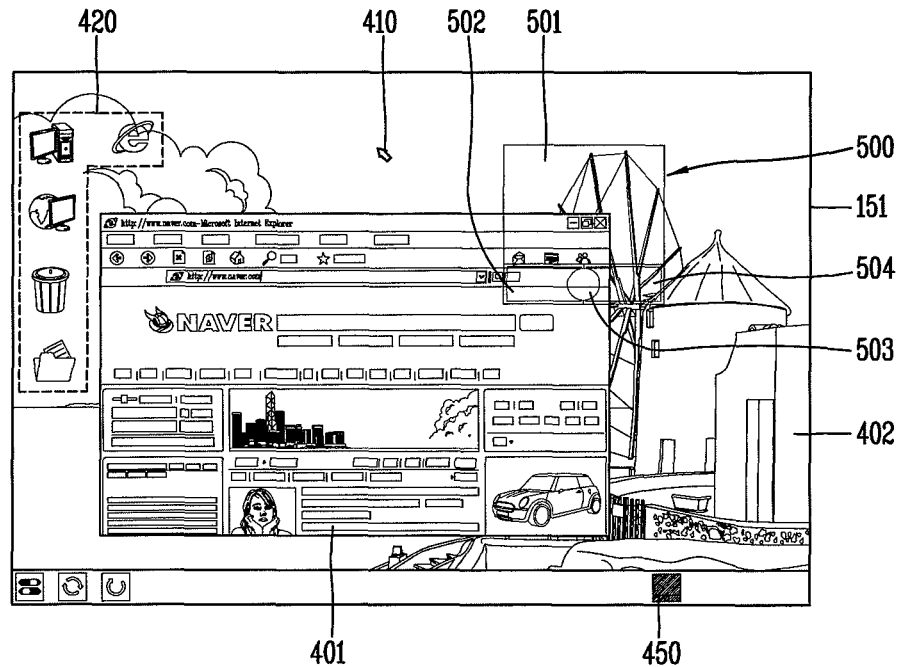
FIGS. 4A through 4E are conceptual views illustrating a method of controlling a screen using a virtual input device displayed on the display unit according to an embodiment of the present invention.

For example, referring to FIG. 4A, the touch input window 500 may be displayed in one region of the display unit 151 with a predetermined transparency to maintain the display of a web page 401 popped-up in one region of the display unit 151 and the background screen 402 as they are. Furthermore, a pointer corresponding to a touch input to the touch input window 500 is displayed in one region of the display unit 151. In addition, when the touch input window 500 is displayed on the display unit 151, an icon 450 for indicating the operating state is displayed in a lower end region of the display unit 151.

In addition, a pointer corresponding to a touch input to the touch input window 500 can control all objects and screens displayed on the display unit 151. For example, when a region displayed with the touch input window 500 is overlapped with a key region for controlling the screen of the web page 401 as illustrated in FIG. 4A, the controller 180 can deactivate the relevant key region and activate only the region displayed with the touch input window 500 even though the key region for controlling the screen of the web page 401 is displayed in a transparent manner. Furthermore, even when a new window screen is popped up on a region displayed with the touch input window 500, the controller can activate only the region displayed with the touch input window 500.

However, as will be described below in more detail, for a preset specific region or specific program, the controller 180 can process the touch input window 500 to be locked or a touch input applied to the touch input window 500 to be ineffective.

Figure 4B:
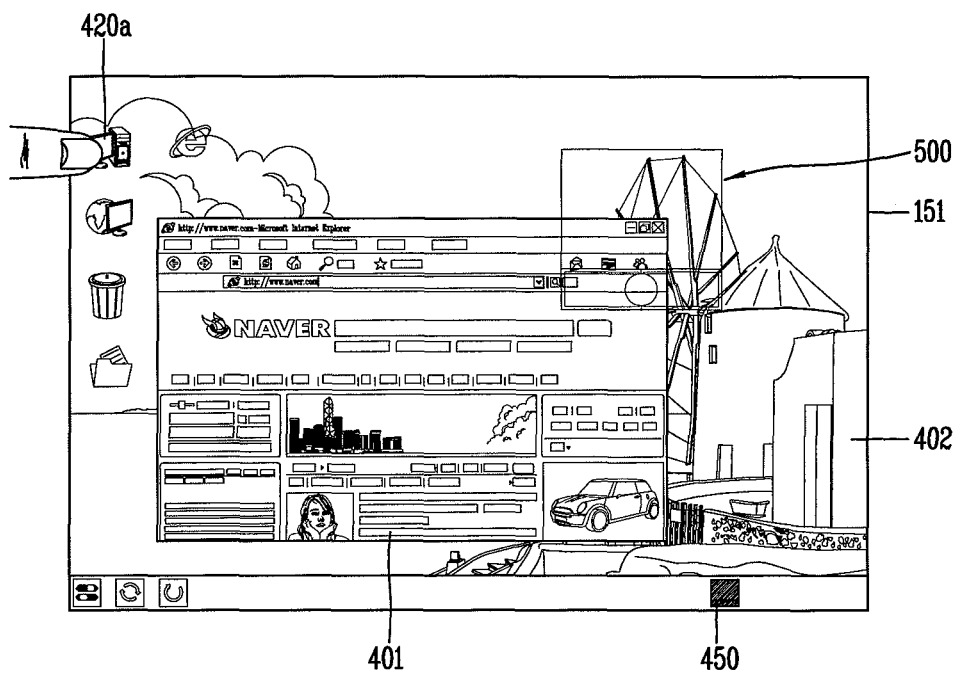

Hereinafter, referring to FIG. 4D, as an example of the touch input window 500, the shape and function of a mouse pad will be described in more detail with reference to FIG. 4D. As illustrated in FIG. 4D, the touch input window may include a plurality of distinguishable regions 501, 502, 503, 504. Furthermore, each of the regions 501, 502, 503, 504 can sense a touch input location, a pressure level, a touch time, a touch drag length, a touch frequency, and the like implemented by a user's hand, stylus pen or the like.

For example, the first region 501 may correspond to a mouse pad region for controlling the pointer. Furthermore, the second region 502 may correspond to an input region for executing a left button of the mouse, namely, a click function. Furthermore, the third region storage unit 503 may be correspond to an input region for moving the touch input window to another location or executing a pinning function for fixing it to a specific location. Furthermore, the fourth region 504 may correspond to an input region for executing a control command for displaying a right button of the mouse, namely, a context menu.

In addition, the touch input window according to an embodiment of the present invention is not limited to the foregoing shapes and regions, and can be implemented in various shapes based on the user's input or according to the user's convenience. Furthermore, the touch input window in FIG. 4D may be additionally provided with a virtual input device such as a mouse scroll, a joystick and the like.

Figure 4C:
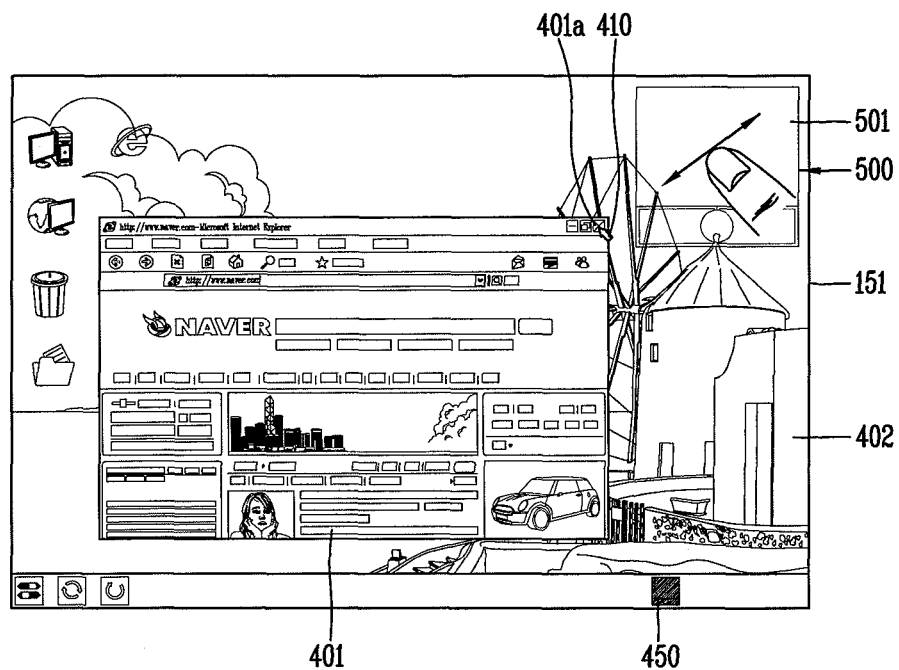
Figure 4D:
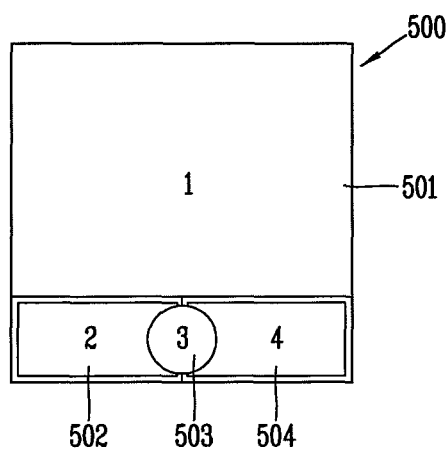
Figure 4E:
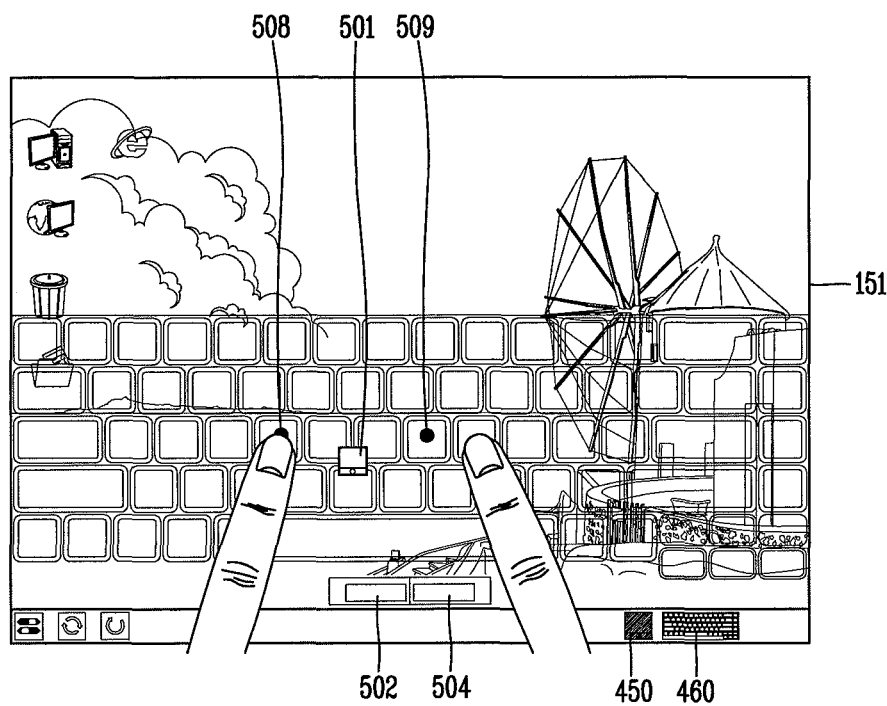

FIG. 4E illustrates an example of the foregoing virtual input device in which a virtual keyboard is added thereto. The key layout scheme of a virtual keyboard illustrated in FIG. 4E may vary based on the number of activated input languages (for example, Korean, English, Japanese, French, and the like) and input keys.

In addition, the controller 180 can adjust the virtual keyboard layout in a suitable manner according to the key layout scheme of the keyboard to display it on the display unit 151. Furthermore, the controller 180 can acquire an input language value based on the location of a pointer displayed on the display unit 151, and display a virtual keyboard laid out with "Korean" language.

The virtual touch input window according to an embodiment of the present invention is preferably displayed in a direction that does not hinder the input and output of the display unit 151 as much as possible, and thus the display of keys corresponding to input language values is also formed to have a preset transparency.

In addition, key information may also not be displayed for each key of the virtual keyboard. In this instance, it may be possible to display a protruding shape on keys corresponding to "FJ" keys (or Korean "ㄹ, ㅓ" keys) 508, 509 on the virtual keyboard or output a predetermined vibration according to a touch input. Meanwhile, when a different input language value is acquired according to the location change of a pointer, the controller 180 can sense the acquired language and change the layout of the virtual keyboard.

Subsequently, referring to FIG. 4E, the virtual keyboard may further include a key corresponding to a virtual mouse. For example, as illustrated in FIG. 4E, a mouse 501 for controlling a pointer displayed on the display unit 151 can be displayed in a central region of the virtual keyboard, and the left button 502 and right button 504 of the mouse may be displayed in a lower end region of the virtual keyboard. Furthermore, when a touch input is sensed with respect to specific keys corresponding to the virtual keyboard and virtual mouse, a display corresponding to the input of the relevant key, for example, a shading effect or the like, may be displayed thereon. Also, a plurality of icons 450, 460 indicating that the virtual mouse and keyboard devices are activated may be displayed in a lower end region of the display unit 151.

When a touch input window is displayed on the display unit 151 as described above, the sensing unit 140 can sense a touch input applied to the touch input window or a touch input applied to a region out of the touch input window. Further, a touch input performed within the touch input window is accompanied by a process of converting it into input data corresponding to the relevant input device, namely, mouse input data or keyboard input data.

In addition, a touch filter driver program for recognizing the X, Y coordinates and their coordinate change amounts corresponding to a touch performed in a region displayed with the touch input window can be stored in the memory unit 160 of the image display device 100 according to an embodiment of the present invention. The touch filter driver program may be stored in advance in the memory 160, but may be downloaded and installed from other external devices or servers.

For example, the X, Y coordinates of a pointer associated with the touch input window can be transferred to the controller 180 at a time point at which the touch input window is displayed on the display unit 151. Furthermore, the X, Y coordinate change amounts of the pointer may be transferred to the controller 180 whenever a touch is applied to the touch input window.

The controller 180 can compare a coordinate value received by executing the touch filter driver program with a coordinate value in the region displayed with the touch input window (can be determined whether or not the touch input window is activated) to determine whether a touch corresponding to the received coordinate value is performed within the touch input window or performed in a region out of the touch input window.

When it is determined that the coordinate value transferred to the controller 180 is a touch input applied to the touch input window, a control command corresponding to a descriptor predefined in the touch filter driver program is performed.

Further, the predefined descriptor is transferred to the controller 180 using an event notification scheme. For example, when the touch input window is divided into a plurality of regions, as described below in more detail, a descriptor corresponding to the location of a region sensed with a touch input is formatted in a predefined message form and transferred to the controller 180, and the controller 180 performs a control command corresponding to a region sensed with the touch input based on the transferred information.

In addition, when the X, Y coordinate values transferred to the controller 180 is recognized as being started from a region out of the touch input window, it is transferred as it is to an operating system (OS) touch input program within the image display device 100. On the contrary, when the X, Y coordinate values and their coordinate change amounts transferred to the controller 180 are recognized as being started from within the touch input window, they are transferred to an OS input program (for example, a program such as an OS a keyboard, a mouse, a joystick or the like) to convert the coordinate values of a touch input applied to the touch input window into input data corresponding to the keyboard, mouse, or joystick.

Thus, in response to a first touch input being sensed in a region displayed with the touch input window 500, the controller 180 displays a pointer moving in proportion to the movement of the first touch input in one region of the display unit 151. Furthermore, the controller 180 controls to point a specific object with the displayed pointer to execute the corresponding control command (S330).

Further, the first touch input may be a drag touch input started from a region displayed with the touch input window. The first touch input may also be a double short touch input applied to within a region displayed with the touch input window 500 when the displayed pointer points a specific object. Hereinafter, such a touch input is referred to as an "indirect touch input."

Furthermore, the shape of a pointer displayed according to a touch input can be implemented with a preset shape, for example, an arrow shape, but is not limited to this, and can be varied in various ways according to the user's selection or implemented to be automatically selected in an appropriate form according to the type of an application at which the pointer is located.

In addition, the controller 180 can control the movement of the pointer in proportion to the touch force, drag length, drag speed or the like of the first touch input or in a similar manner thereto based on an area of the touch input window. For example, when the displayed touch input window is smaller than a preset size, the moving distance of a pointer corresponding to the drag length of a first touch input may be changed to be larger. Also, when the displayed touch input window is larger than a preset size, the moving distance of a pointer corresponding to the drag length of a first touch input may be changed to be smaller. In another example, the moving speed of a pointer may be faster as increasing the drag speed of the first touch input started from a region displayed with the touch input window.

Furthermore, the controller 180 can control the moving speed of a pointer in proportion to the movement of a first touch input to be varied according to the attribute of a region located with the pointer. For example, when the attribute of a region located with the pointer contains a plurality of menu objects, the moving speed of a pointer in proportion to the movement of a first touch input may be decreased than the reference value for more accurate control.

In addition, at least one of a sound, a vibration and a highlighting effect corresponding to the first touch input may be displayed in response to the first touch input being sensed in a region displayed with the touch input window. Further, when an effect corresponding to the first touch input is output as a sound or vibration, the level of the sound or vibration may be differently output in proportion to the pressure and speed of a touch input applied thereto.

Referring to FIG. 4C, a pointer 410 is displayed in one region of the display unit 151 when a drag touch input is applied to one region of the touch input window 500. The user can move a touch applied to the touch input window 500 in the left, right, upward and downward direction to move the pointer 410 in a length and direction in proportion thereto or similar thereto.

Further, for the X, Y coordinates of the pointer 410, as described above, the controller 180 first determines whether a coordinate value corresponding to the touch input is started from within the touch input window (filtering) using a touch filter driver program, and when it is determined that the coordinate value corresponding to the touch input is started from within the touch input window, the controller 180 converts it into input data suitable to the relevant input device, namely, mouse input data, to transfer it to the OS program of the image display device 100. The user can point an end key 401*a* of the popped up web page 401 with the pointer 410 to terminate the popped up web page 401.

In addition, when a second touch input is sensed on an object displayed in a region out of the touch input window on the display unit 151, the controller 180 can control the displayed pointer to disappear, and apply a function corresponding to the second touch input to the object (S340). Further, the second touch input may be a long touch input or drag touch input started from a region out of the region displayed with the touch input window. The second touch input may also be a double short touch input applied to an object displayed in the region out of the touch input window. Hereinafter, such a touch input is referred to as a "direct touch input."

Also, a function corresponding to the second touch input may be varied according to the attribute of an object. For example, when an object applied with the second touch input is an icon of a specific application, a function corresponding to the second touch input may be an execution command of the specific application corresponding to the icon. Otherwise, when an object applied with the second touch input is a specific menu key, a function corresponding to the second touch input may be an execution command for entering a screen corresponding to the relevant menu key.

Referring to FIG. 4B, even when the touch input window 500 is displayed and activated on the display unit 151, the user can perform a direct touch input to a specific icon 420*a* displayed on the display unit 151. At this time, a pointer controlled through a touch to the touch input window 500 disappears from the screen.

When a touch input is started from a region out of the touch input window 500 as described above, the controller 180 produces only coordinates for a position applied with the touch input to transfer them to the OS program. The user can perform a direct touch input to a specific icon 420*a* to execute the corresponding application. Further, a shape (for example, a hand-shaped indicator) distinguished from the pointer indicating a position at which the user performs a touch input may be displayed at the same time.

In addition, the user can perform a direct touch input as described above, and then immediately perform an indirect touch input with no manipulation in a natural and subsequent manner. For example, a manipulation for controlling a large screen displayed on the display unit 151 may be performed with a "direct touch input", and a manipulation for selecting and controlling small objects displayed on the display unit 151 may be performed with an "indirect touch input" using a pointer. Such an operation may be subsequently and alternately performed with no switching operation.

In addition, a pointer for performing an "indirect touch input" is located on a target object, and a user's hand, a stylus pen or the like for controlling the pointer is located at or adjacent to the touch input window, thereby not causing inconvenience in which the pointer or target object is hidden by the user's hand or stylus pen.

As described above, according to the embodiments of the present invention, an input device associated with the image display device may be implemented to be located within the screen while not hiding the other objects, thereby overcoming the limitation of a physical space due to the input device. Furthermore, it is possible to minimize the limitation of an input and output to the screen, and avoid an inconvenience in which an object to be pointed by the user's hand or stylus pen is hidden.

In addition, the foregoing touch input window 500 may be displayed at a user's desired location. Next, a method of moving a virtual input device displayed on the display unit to a desired location will be described with reference to FIGS. 5A through 5C.

Upon receiving a request of the touch input window, the touch input window 500 having a predetermined transparency is displayed in one region of the display unit 151. The touch input window 500 may be provided with one region or button containing a pinning function for moving it to another location or fixing it to a specific location (hereinafter, referred to as a "pinning key").

Figure 5A:
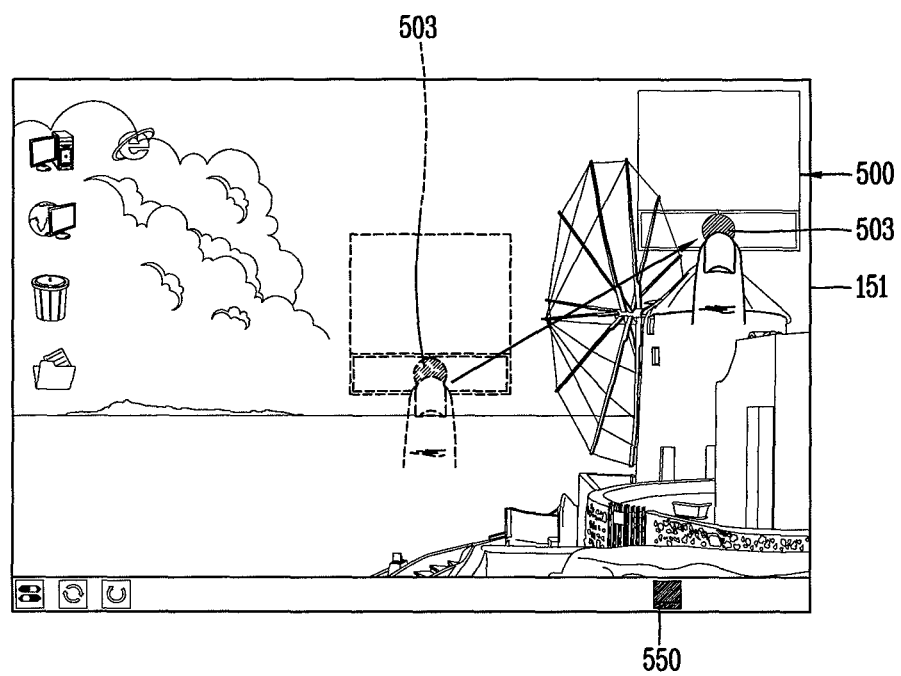

The controller 180 can move the touch input window as it is dragged along the drag touch direction in response to a touch and drag action, which is applied to a preset region, namely, a pinning key, in the touch input window. For example, as illustrated in FIG. 5A, the touch input window 500 can be moved to a desired location and in a desired direction when the user's touches a pinning key 503 of the touch input window 500. Further, a display indicating a touch, for example, shading effect or transparency decrease effect, is displayed on the pinning key 503.

In addition, a touch applied to the touch input window is also based on the X, Y coordinates on the display unit 151, and thus the activated touch input window should be located within at least one region of the display unit 151. Accordingly, a boundary region may be configured such that the touch input window is located within the display unit 151.

Specifically, when at least part of the touch input window moving along a touch direction in which a touch applied to the pinning key 503 is dragged outside of a preset boundary region, the controller 180 can control the display unit 151 so the touch input window is located therewith based on the preset boundary region.

In addition, when the touch input window is returned to a position within a preset boundary region of the display unit 151, an animation effect such as being loaded with a spring may be applicable thereto. In other words, the physical laws of motion such as acceleration and inverse acceleration can be applied to the touch input window 500, and thus the touch input window 500 can be returned in a bouncing manner in proportion to a distance moving out of the preset boundary region, a force and speed being hit against the boundary region according to a touch. Furthermore, when the touch input window 500 is consecutively hit against a plurality of boundary regions, the direction of the touch input window 500 being returned in a bouncing manner may be changed.

Figure 5B:
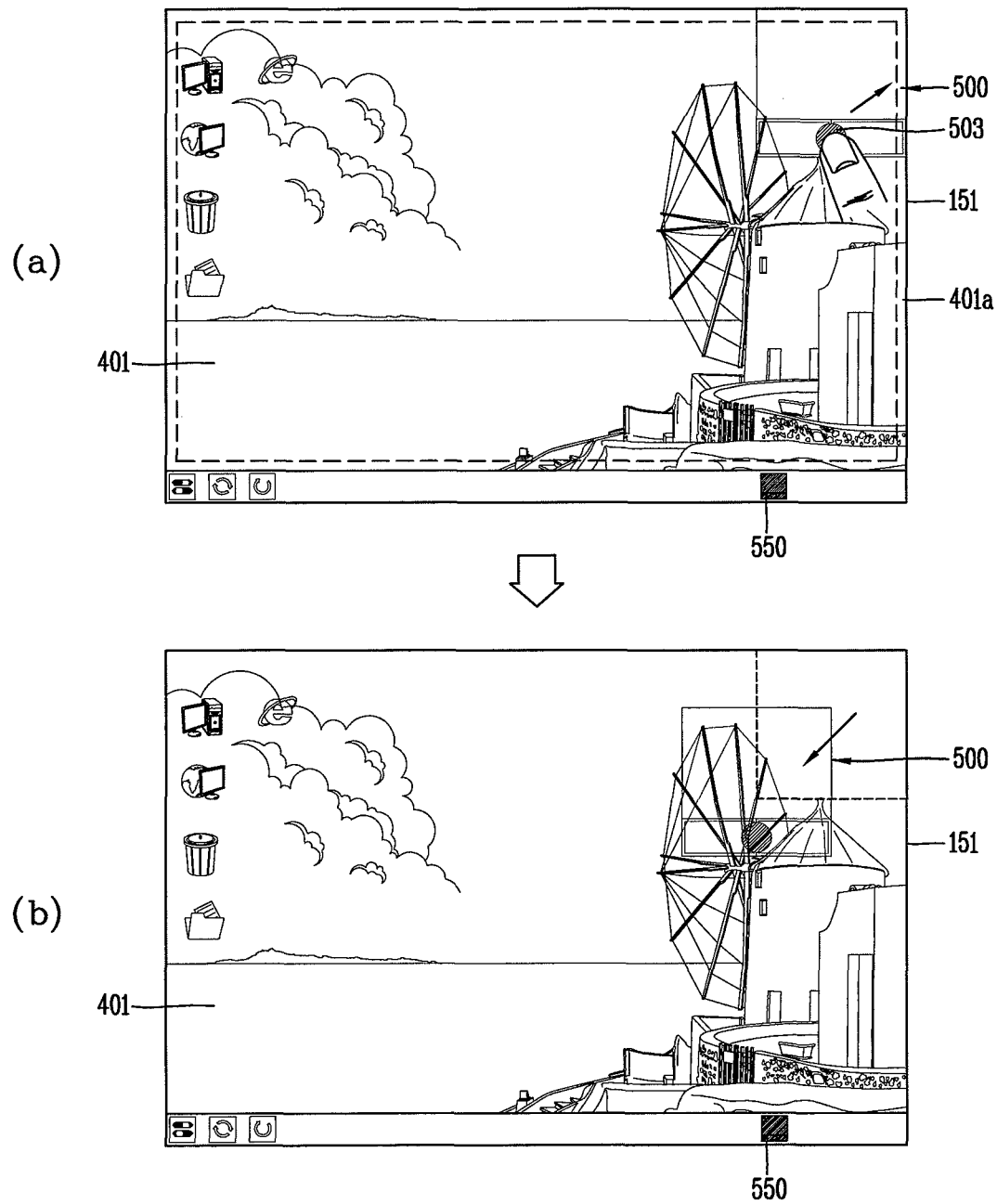

For example, referring to FIG. 5B, when the touch input window 500 is brought to the boundary region 401*a* when the user touches the pinning key 503 on the touch input window 500 (refer to FIG. 5B(a)), the touch input window 500 is bounced and returned to within the display unit 151 with an inverse acceleration of the direction and force dragged by the user (refer to FIG. 5B(b)).

In addition, according to another example, a boundary region may be configured in a thicker manner for a specific region 401*b*, for example, a region in which the user interface is shown by a direct touch input, on the display unit 151 as illustrated in FIG. 5C. According to another example, even when the touch input window is displayed within the relevant region, a touch to the displayed touch input window may be treated to be ineffective.

Figure 6A:
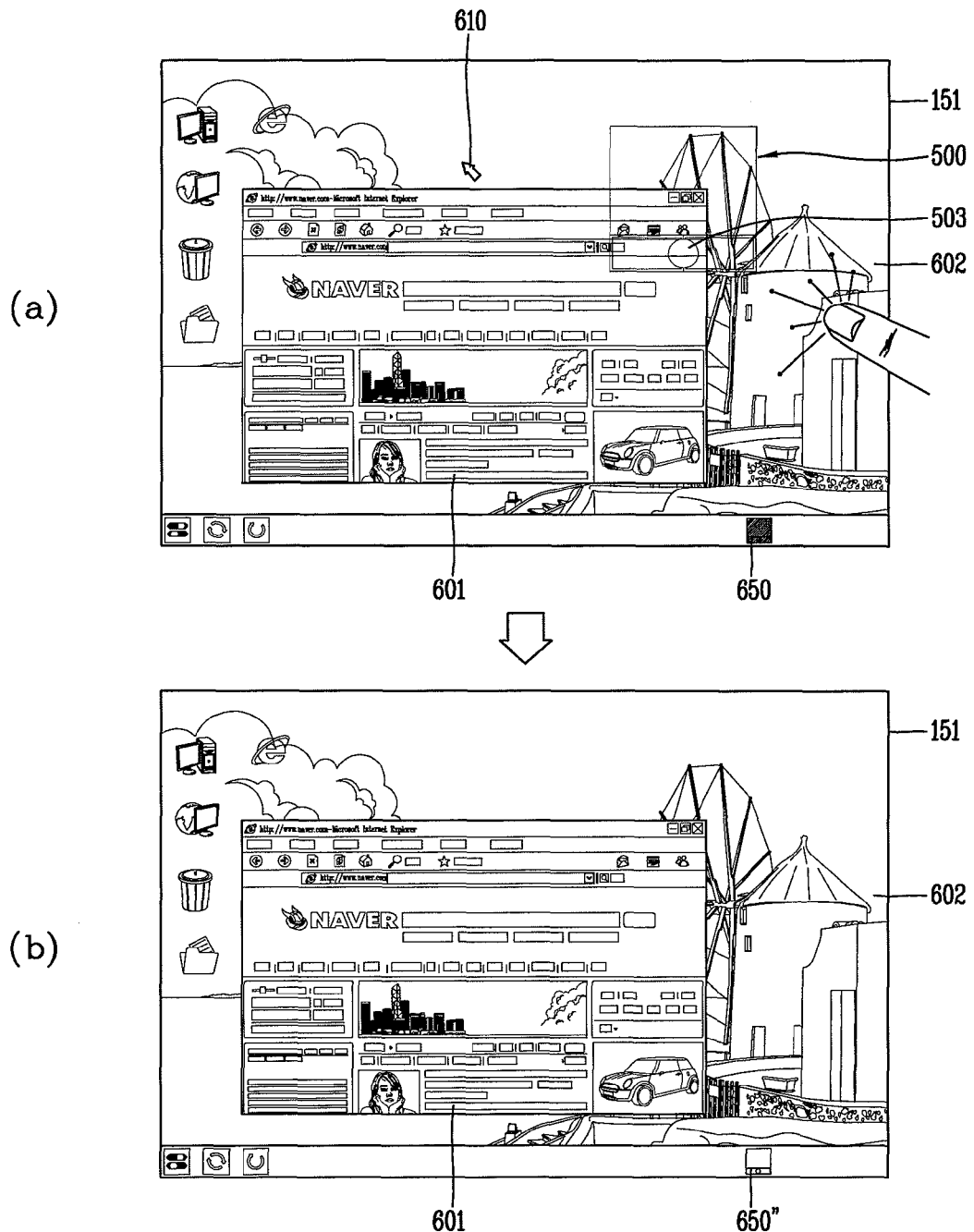
FIGS. 6A and 6B are conceptual views illustrating a method of releasing and fixing a virtual input device displayed on the display unit from and to the screen according to an embodiment of the present invention.
Figure 6B:
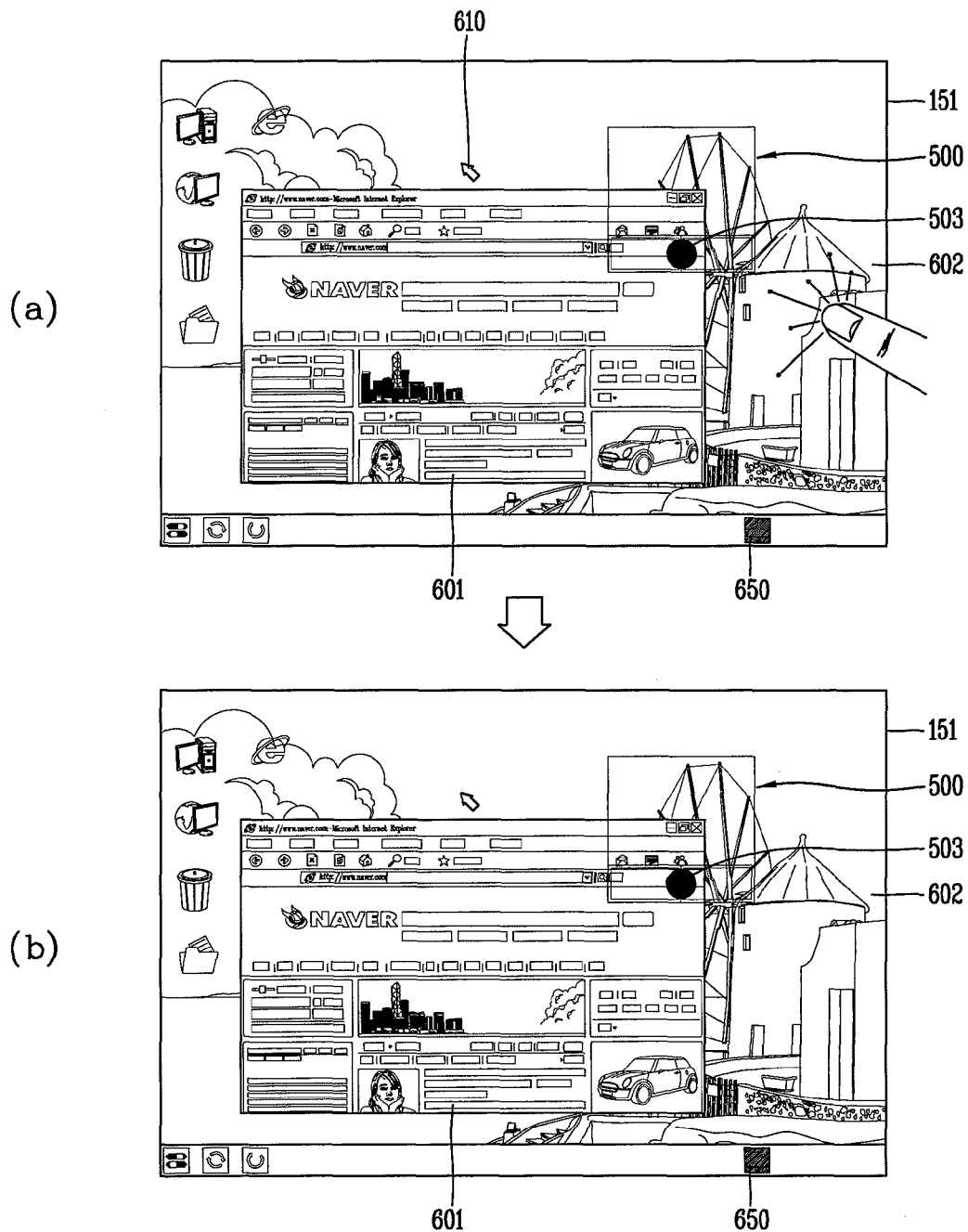

Hereinafter, a method of releasing the foregoing touch input window from the screen or continuously fixing to the screen according to the user's convenience will be described. In particular, FIGS. 6A and 6B are conceptual views illustrating a method of releasing and fixing a virtual input device displayed on the display unit 151 from and to the screen according to an embodiment of the present invention.

When a request of the touch input window 500 is received through any one of the foregoing methods, the touch input window 500 having a predetermined transparency is displayed on the display unit 151. A preset region of the touch input window 500 may include the pinning key 503 for allowing the movement.

In addition, a display corresponding to a first and a second mode selectively activated according to the user's touch is displayed in a preset region of the touch input window 500. Further, a distinction between the first and second mode may be implemented by changing a transparency or displaying a shading effect for the preset region.

Also, the first mode is a general mode, and the second mode is a fixed mode. For example, when the user makes a short touch to a preset region of the touch input window 500, the first mode can be changed to the second mode. Furthermore, when the user makes a short touch again to a preset region of the touch input window 500, the second mode can be restored again to the first mode.

In the first mode, the controller 180 can control the touch input window 500 and the pointer 610 to disappear from the display unit 151 in response to a preset touch being sensed in the background screen region out of the touch input window.

The disappeared touch input window may be displayed again on the screen when an icon of the touch input window displayed in one region of the display unit 151 is touched. Further, upon receiving a request of the touch input window, the controller 180 memorizes the locations of the touch input window and the pointer that have been displayed prior to disappearing from the display unit and controls them to appear at the relevant locations, respectively.

In addition, in the second mode, the controller 180 maintains the display of the touch input window 500 and the pointer 610 even when a preset touch is sensed in the background screen region out of the touch input window. For example, as illustrated in FIG. 6A, when a user touches the background screen region 602 outside of the touch input window 500 (refer to FIG. 6A(a)) when the pinning key 503 of the touch input window 500 is in a general mode, the touch input window 500 and pointer 610 disappear from the screen (refer to FIG. 6A(b)).

Then, a display indicating that the touch input window 500 is in a deactivated state is displayed on the icon 650 of the touch input window (650"). On the contrary, as illustrated in FIG. 6B, when the pinning key 503 of the touch input window 500 is in a fixed mode (a display corresponding to the fixed mode is displayed), even when the user touches the background screen region 602 out of the touch input window (refer to FIG. 6B(a)), the touch input window 500 and pointer 610 are maintained without disappearing from the screen (refer to FIG. 6B(b)).

Hereinafter, an example of executing different functions according to a touch in each region when the foregoing touch input window 500 contains a plurality of regions will be described. Further, an example in which the touch input window functions as a mouse input device for the purpose of explanation, but examples for implementing the same function as that of an actual input device even when another input device such as a virtual keyboard, joystick or the like is added or switched to the touch input window.

Figure 7B:
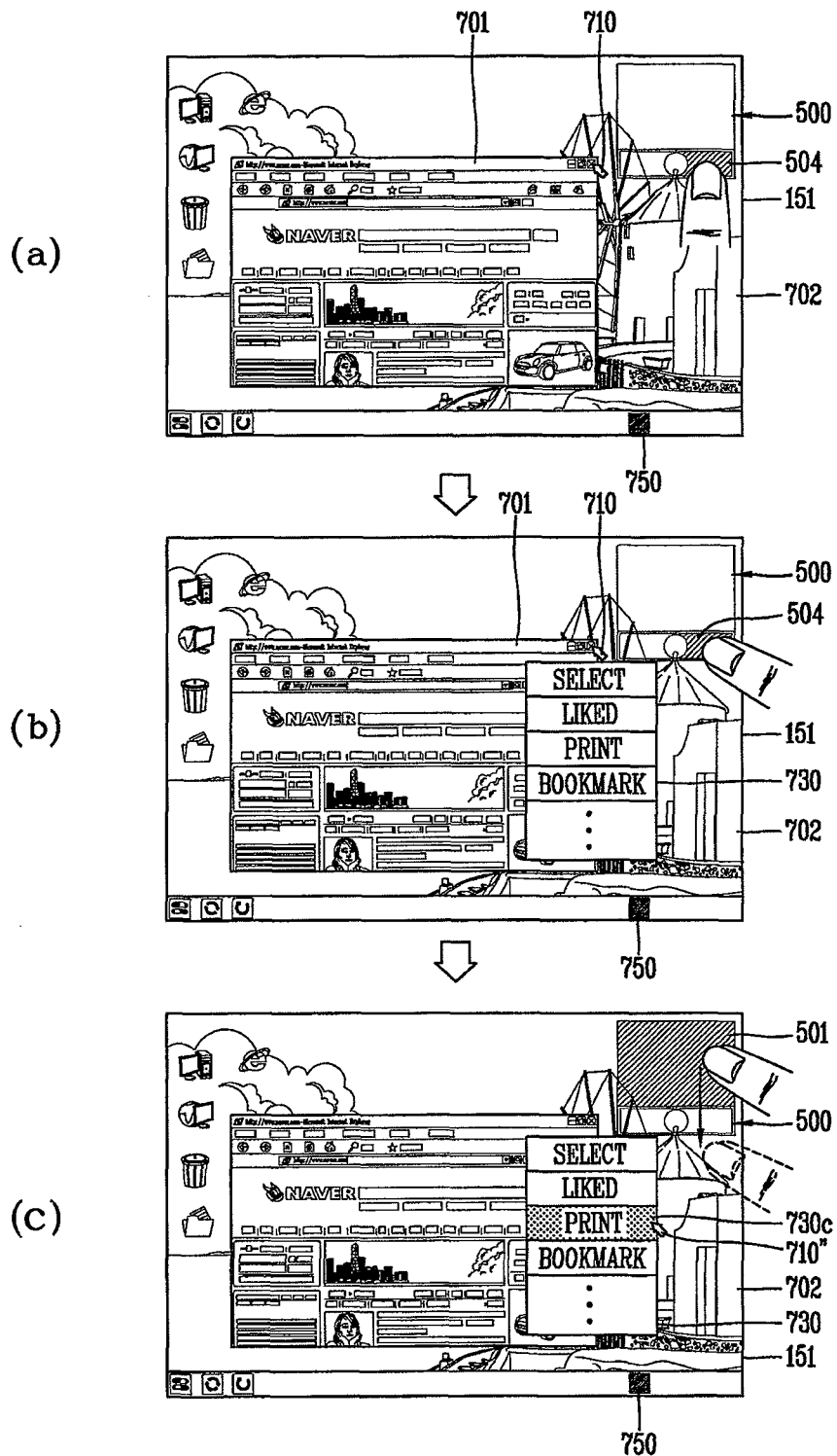

FIGS. 7A through 7D are conceptual views illustrating a method of executing different functions in a virtual input device displayed on the display unit according to an embodiment of the present invention. Furthermore, FIG. 8 is a conceptual view illustrating a method of displaying a virtual input device in a plurality of regions on the display unit according to an embodiment of the present invention.

Upon receiving a request of the touch input window 500, the touch input window 500 having a predetermined transparency is displayed on the display unit 151 of the image display device 100. The displayed touch input window 500 may include a first and a second region capable of executing at least different functions.

More specifically, when a start point of the first touch input applied to the touch input window 500 is executed in the first region, the controller 180 can perform a click or double click function to an object indicated by the pointer. Furthermore, when a start point of the first touch input applied to the touch input window 500 is executed in the second region distinguished from the first region, the controller 180 displays a menu item for executing at least one function associated with a position or region displayed with the pointer.

In addition, a function associated with the position or region displayed with the pointer is determined by a position located with the pointer at the moment a touch is started in the second region. The controller 180 can also output a display in a region to which the start point of the first touch input is applied between the first and the second region, which is visually distinguished from the other region.

Referring to FIG. 7A, when the user makes a short touch to a lower left end region 502 of the touch input window 500 (refer to FIG. 7A(a)), a double click function to an object 701*a* pointed by the pointer 710 is performed (refer to FIG. 7A(b)). In other words, when a lower left end region 502 of the touch input window 500 is touched, the same function as that of the left button (MLB) of the mouse is performed. Accordingly, the popped up web page 701 is terminated. The lower left end region 502 can be highlighted as shown in FIG. 7A(a) and then not highlighted in FIG. 7A(b).

Subsequently, referring to FIG. 7B, when the user makes a short touch to a lower right end region 504 of the touch input window 500 when the web page 701 is popped up on the display unit 151 (refer to FIG. 7B(a)), a context menu 730 for performing at least one function associated with a position indicated by the pointer 710 is displayed (refer to FIG. 7B(b)).

In other words, when a lower right end region 504 of the touch input window 500 is touched, the same function as that of the right button (MRB) of the mouse is performed. The user performs a drag touch input to an upper region 501 of the touch input window to point an item desired to be selected by the pointer 710, for example, item "print" 730c (refer to FIG. 7B(c)).

In addition, when a region at which the start point of the first touch input applied to the touch input window is located is different from a region at which the end point of the first touch input is located, the touch input window includes a plurality of regions, the controller 180 can control to execute only a function corresponding to the region at which the start point of the first touch input is located.

Thus, the attribute of a touch input started from the touch input window is maintained until the touch input is released even if it subsequently moves out of the touch input window. It is applied in a similar manner to when the touch input started from a region out of the touch input window subsequently enters into the touch input window.

Figure 7C:
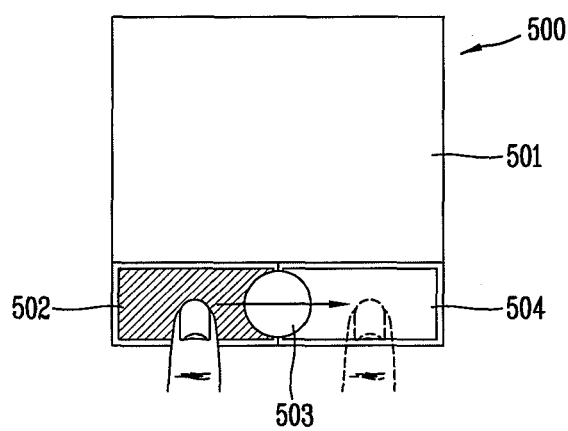
Figure 7D:
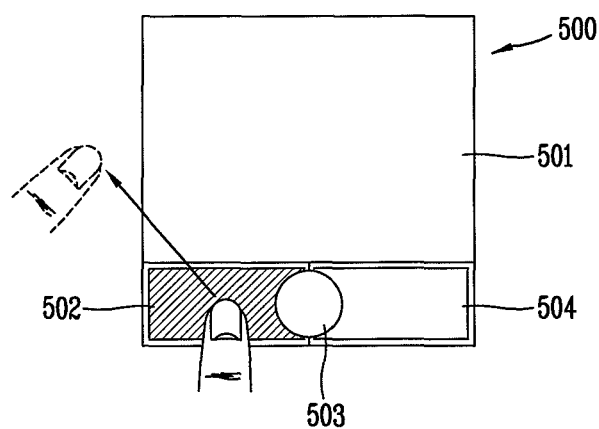
Figure 8:
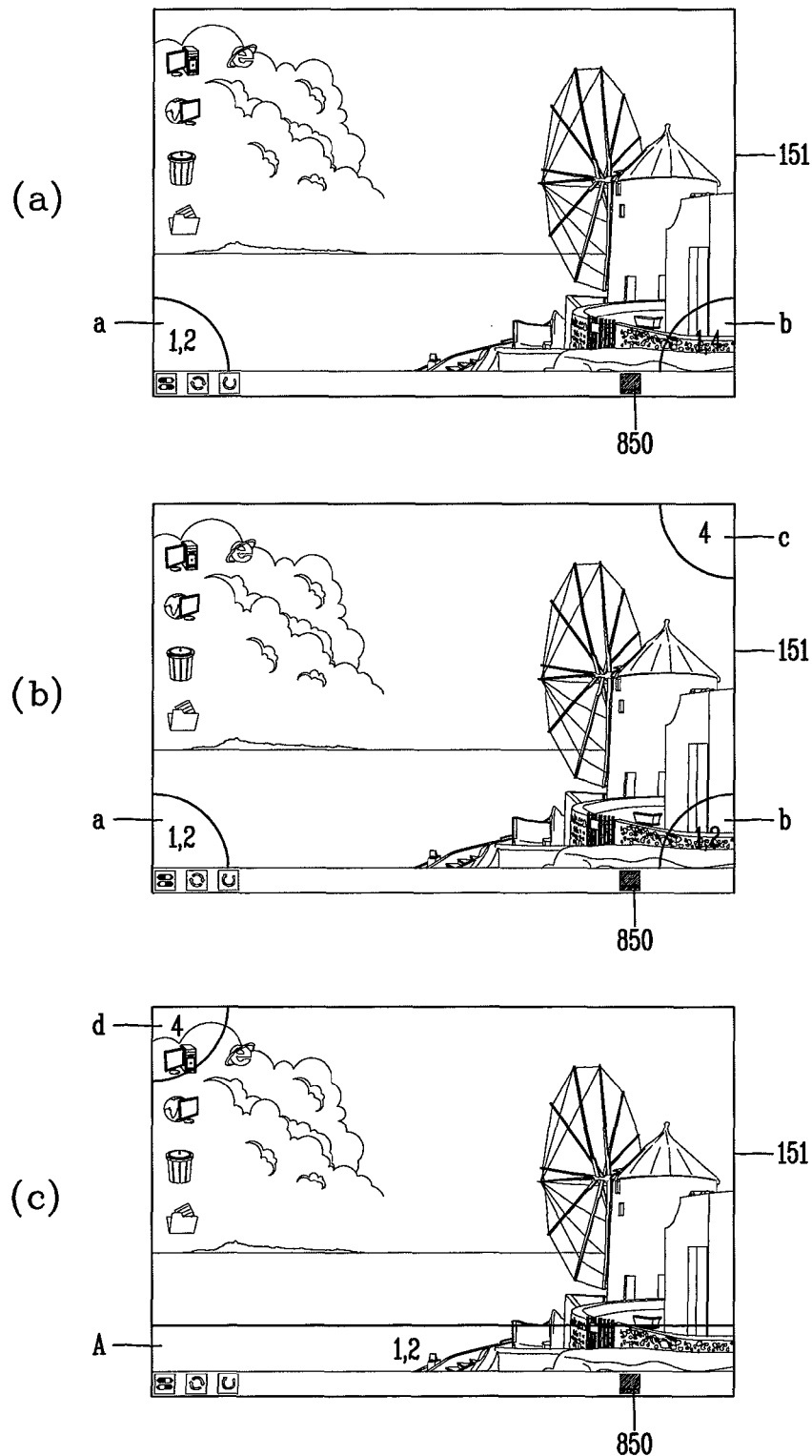
FIG. 8 is a conceptual view illustrating a method of displaying a virtual input device in a plurality of region on the display unit according to an embodiment of the present invention.

For example, referring to FIGS. 7C and 7D, when the user's touch is started from the lower left end region 502 of the touch input window 500, the same function as that of the pushing of the left button (MLB) of the mouse is applied and maintained even when the relevant touch moves out of the lower left end region 502 to the lower right end region 504 (FIG. 7C) or completely moves out of the touch input window 500 (FIG. 7D). It is applied in a similar manner to when the user's touches the upper end region 501 or lower right end region 504 of the touch input window 500.

In addition, a plurality of regions contained in the foregoing touch input window may be separately displayed in each region of the display unit 151 according to the user's input or when a predetermined condition is satisfied. Specifically, upon receiving the first input signal, the controller 180 can separately display the first and the second region at predetermined locations of the display unit 151.

Furthermore, the controller 180 can display a pointer moving along the movement of the drag touch input in one region of the display unit in response to a drag touch input being sensed in at least one of the separated first and second regions. In addition, the first input signal may be recognized when pushing a specific hard key or soft key or performing a predetermined gesture or voice command.

For example, referring to FIG. 8, upon sensing the first input signal, the controller 180 can display a plurality of regions of the touch input window 500 at lower left/right sides of the display unit 151 for the convenience of the user's hands location (FIG. 8(a)) or a key region corresponding to an infrequently used function, for example, a region corresponding to the mouse right button (MRB), is located at an upper one side of the display unit 151 where the user's hand is not well brought into contact (FIGS. 8(b) and 8(c)).

Further, the area of each separated region illustrated in FIG. 8 may be determined or changed based on the user's input or according to an area of the touch input that has been sensed for a predetermined period of time. In another example, when the touch input window is implemented with a virtual keyboard, the area of keys contained in the virtual keyboard is determined based on the area of a touch input sensed on each key or the location of each key.

For example, a predetermined size may be maintained when the area of the sensed touch input is less than a reference value, and the area of each key can be changed to be larger than the predetermined size to allow the user to correctly perform a touch input when the area of the sensed touch input exceeds the reference value. Furthermore, a key displayed at a location mostly touched by the user's thumb may be displayed with an area larger than the reference value.

In addition, upon sensing the second input signal, the controller 180 can control so a plurality of separated regions, namely, the first and the second region, are contained again in the touch input window 500. Further, the second input signal may be recognized when touching once more a key or region receiving the first input signal (toggle function) or performing a predetermined gesture or voice command.

In addition, the controller 180 can switch a function corresponding to the first touch input executed in the first and the second region based on the user's setting. Further, the switching of a function may be enabled regardless of when the first and the second region are contained in one touch input window 500 or separated in each region of the display unit 151. Furthermore, the user's setting can be automatically set to be matched to the setting of the operating system (OS) of the image display device 100.

Thus, when the setting of the operating system (OS) of the image display device 100 is set to a right handed person, the lower left end region of the touch input window 500 can be automatically set to a mouse left button function, and the lower right end region thereof to a mouse right button function. When the setting of the operating system (OS) of the image display device 100 is set to a left handed person, the lower left end region of the touch input window 500 can be automatically set to a mouse right button function, and the lower right end region thereof to a mouse left button function with no additional user's manipulation. Accordingly, it is possible to provide a user customized user interface environment.

Hereinafter, a method of displaying a touch input window on the display unit 151 based on the screen display direction or resolution change of the image display device 100 will be described. In particular, FIGS. 9A and 9B are conceptual views illustrating a method of displaying a virtual input device based on the screen direction or resolution change of the image display device according to an embodiment of the present invention.

The sensing unit 140 of the image display device 100 according to an embodiment of the present invention can detect the inclination of the image display device body and/or the user's face direction sensed based on the screen of the display unit 151. The display unit 151 displays an object on the screen in a direction determined according to the detected inclination of the body and/or the detected user's face direction.

Subsequently, the controller 180 can control the display direction of the first and the second region of the touch input window 500 to be matched to the determined direction. For example, when the image display device 100 is inclined in the horizontal direction as illustrated in FIG. 9A(a), the display direction of the touch input window 500 is determined in the horizontal direction matched to the objects 901 of the screen and background screen 902.

Figure 9A:
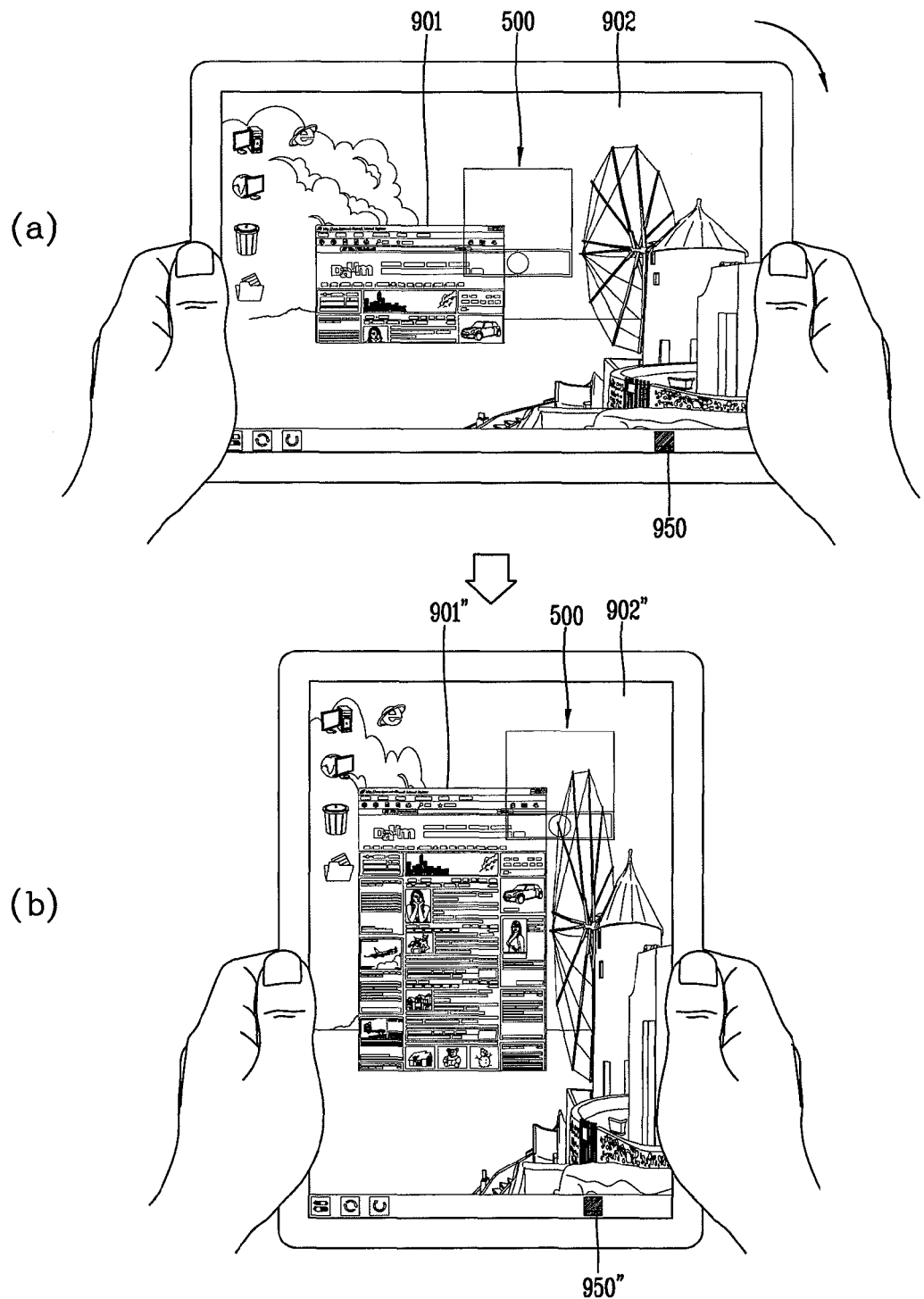
FIGS. 9A and 9B are conceptual views illustrating a method of displaying a virtual input device based on the screen direction or resolution change of an image display device according to an embodiment of the present invention.
Figure 9B:
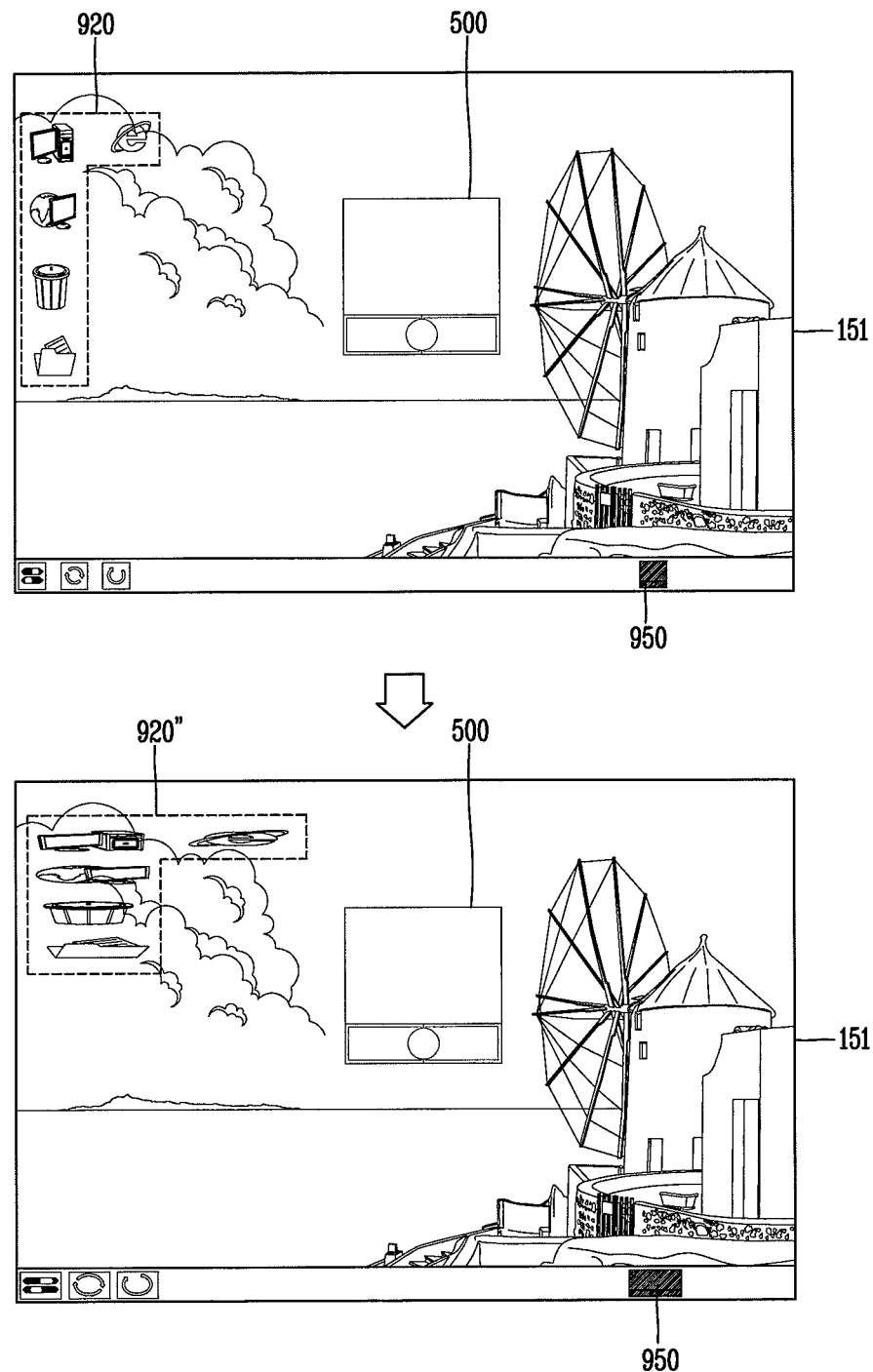

On the contrary, as illustrated in FIG. 9A(b), when the image display device 100 is inclined in the vertical direction, the display direction of the touch input window 500 is determined in the vertical direction matched to the objects 901 of the screen and background screen 902. Furthermore, the controller 180 can control the resolution (or DPI value) of the touch input window to maintain a predetermined value (for example, 400 dpi) even when the resolution of the screen is changed on the display unit 151.

For example, referring to FIG. 9B, though the resolution of the OS is changed so the objects 920 and background screen displayed on the display unit 151 are horizontally spread (920″), the touch input window 500 maintains the previous resolution value as it is and thus the shape thereof is not changed.

In addition, the foregoing size of the touch input window can be adjusted according to the user's input. For example, the touch input window may be displayed with the same size as that of the display unit 151. In this instance, when the touch input window is activated, an "indirect touch input" to the object is deactivated.

In this regard, FIGS. 10A through 10F are a conceptual view illustrating a method of adjusting the size of a virtual input device and a method executing an input through the size-adjusted virtual input device according to an embodiment of the present invention. According to a request of the touch input window, the touch input window having a predetermined transparency is displayed in one region of the display unit 151.

The controller 180 can change the size of the touch input window based on the user's input. Further, the user's input may be a touch input for dragging a plurality of touch points applied to the touch input window from the inside to the outside (size expansion) or dragging them from the outside to the inside (size reduction). Otherwise, it may be a specific key input through which a plurality of size levels are set in advance to gradually increase or decrease the size level in proportion to the input frequency.

Figure 10A:
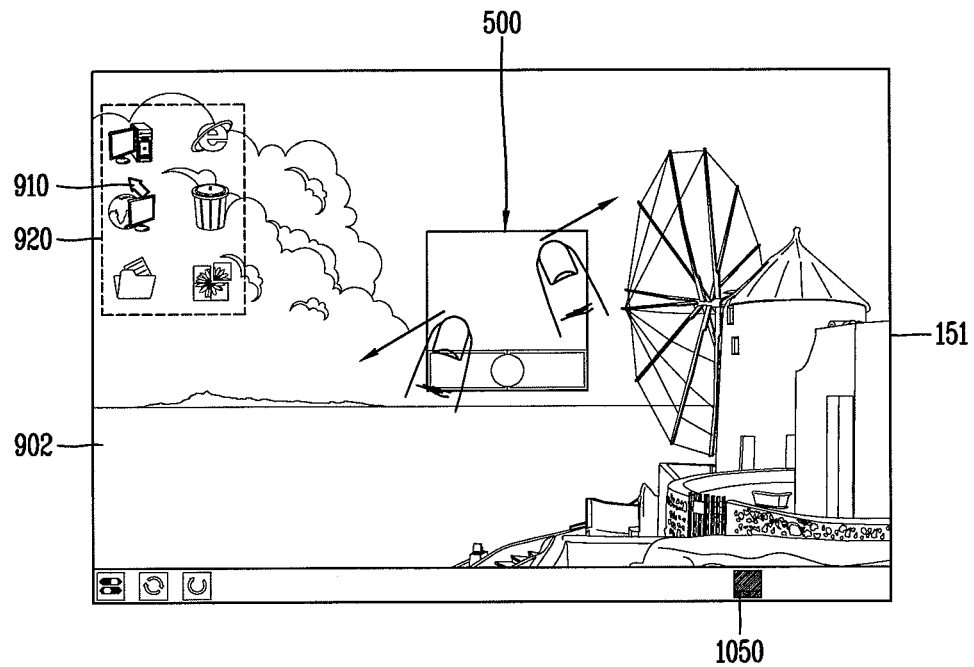
FIGS. 10A through 10F are a conceptual view illustrating a method of adjusting the size of a virtual input device and executing an input through the size-adjusted virtual input device according to an embodiment of the present invention.
Figure 10B:
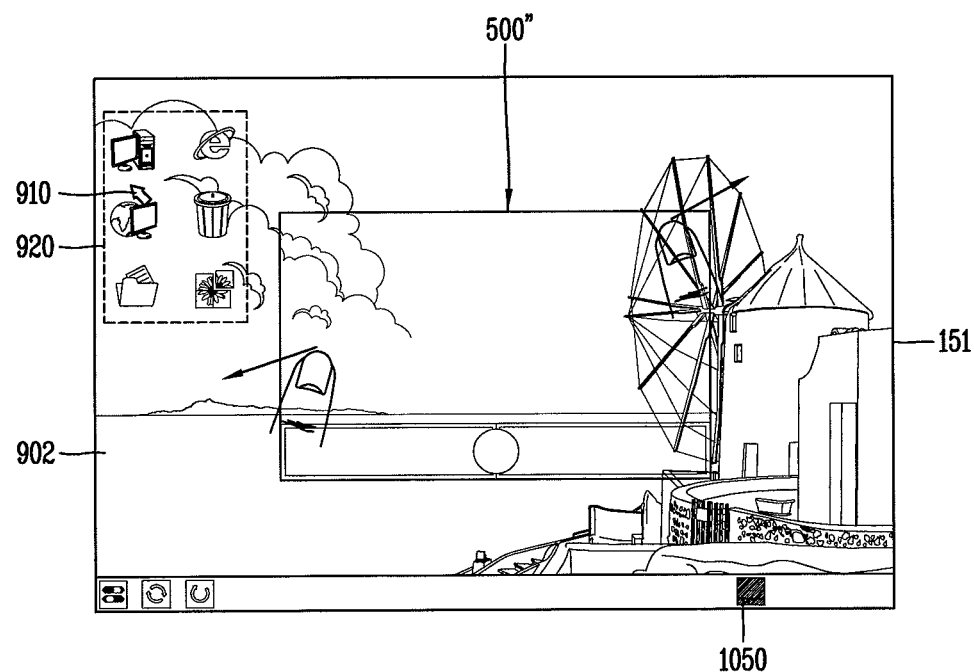

For example, as a plurality of touch positions applied to the touch input window are dragged to the outside when the user applies the plurality of touches to the touch input window 500 as illustrated in FIG. 10A, the size of the touch input window is expanded (500″) as illustrated in FIG. 10B. Further, the size expanded touch input window 500″ is displayed in a transparent manner and thus the background screen or objects overlapped with the expanded portion are shown as they are in a transparent manner. In addition, the maximum size of the touch input window may be identical to that of the display unit 151 as described above.

Thus, when the size of the touch input window is identical to that of the display unit 151, the controller 180 can display a pointer at a position sensed with a third touch input in response to the third touch input being sensed on the display unit 151. Further, the third touch input may be a long touch input distinguished from the foregoing first touch input or second touch input.

When the touch input window is used as an entire region of the display unit 151, there is an inconvenience that the user has to repeat a plurality of touch inputs or perform the drag of a touch input for a long period of time to move the pointer to his or her desired position. In other words, in order to compensate the disadvantage of an indirect touch input with a direct touch input, it may be changed so the pointer can be immediately moved to a desired position or the vicinity thereof Subsequently, when the first touch input is sensed on the display unit 151 when the pointer is displayed at a location sensed with the third touch input, the controller 180 can display the pointer moving along the movement of the first touch input in one region of the display unit. That is, the user can move the pointer to the vicinity of his or her desired position according to the first touch input, and then perform a touch and drag on the screen for a more precise control, thereby correctly moving the pointer to his or her desired position.

Figure 10C:
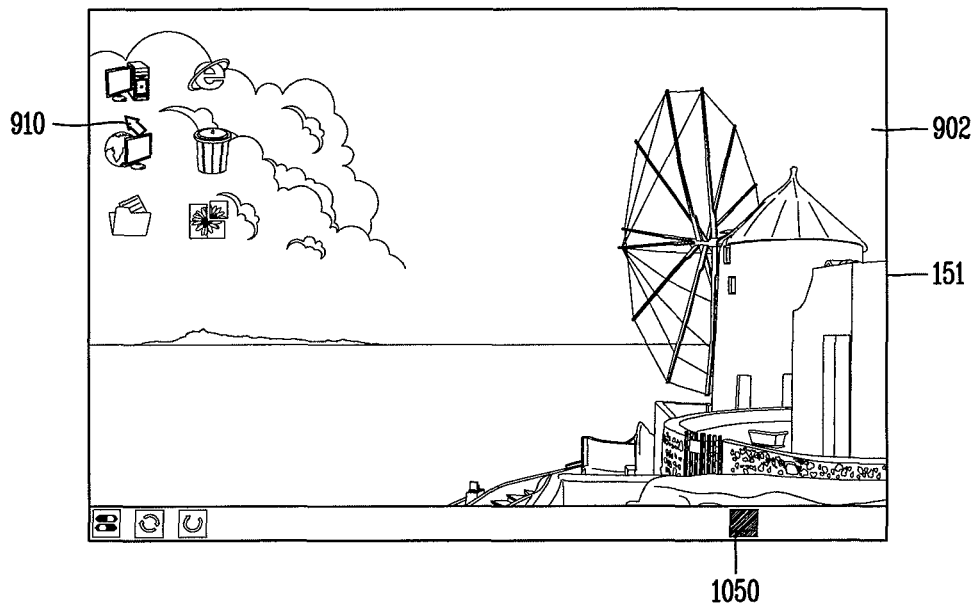

For example, when a plurality of touches are applied to the size-expanded touch input window 500″ to further drag it to the outside as illustrated in FIG. 10B, an entire region thereof becomes the touch input window as illustrated in FIG. 10C. A regional distinction disappears from the touch input window displayed on the entire region to display only the pointer 910. Whether or not the touch input window is activated may be seen from the display status of the touch input window icon 1050 displayed in a lower end region of the display unit 151.

In addition, when the entire region of the display unit 151 becomes the touch input window, the entire region of the display unit 151 may perform the same function as that of the mouse pad. Furthermore, a partial region for performing a mouse right button function may be displayed in one region of the display unit 151.

Figure 10D:
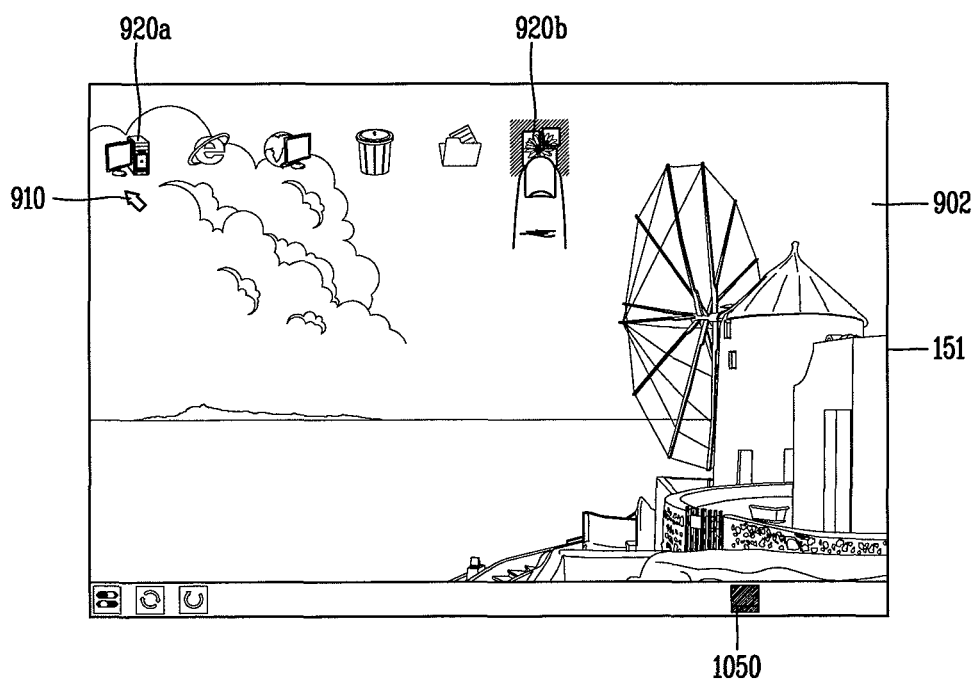
Figure 10E:
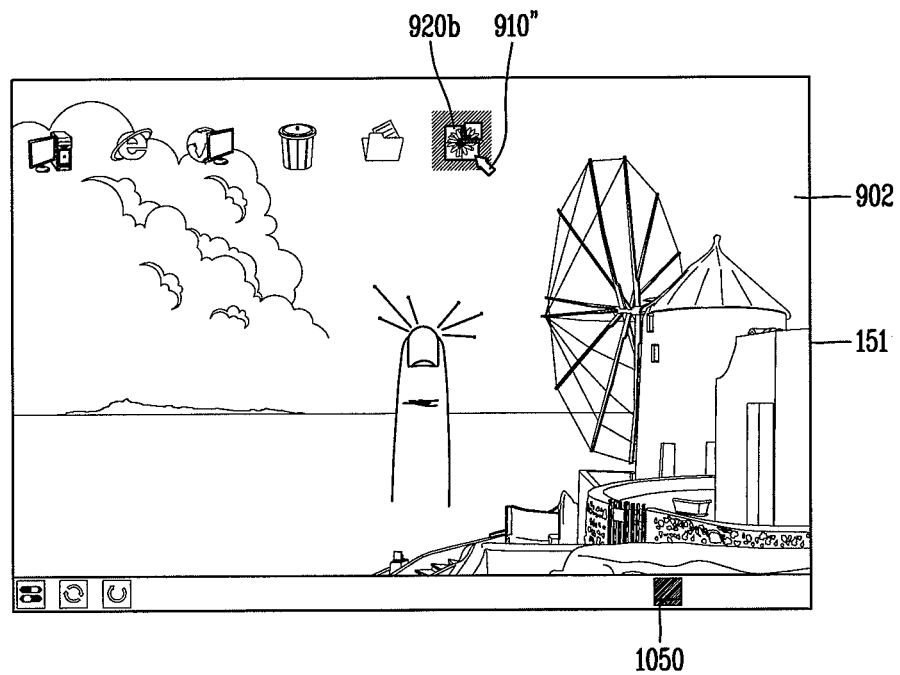

Further, in order to solve an inconvenience that the user has to repeat a plurality of touch inputs or perform the drag of a touch input for a long period of time on the display unit 151 to move the pointer to his or her desired position, when the user performs a long touch input to a position 920b at which the user desires to move the pointer as illustrated in FIG. 10D, the pointer 910 positioned in the vicinity of the first icon 920a is displayed on the second icon 920b at which a long touch input is sensed as illustrated in FIG. 10E (910″).

Figure 10F:
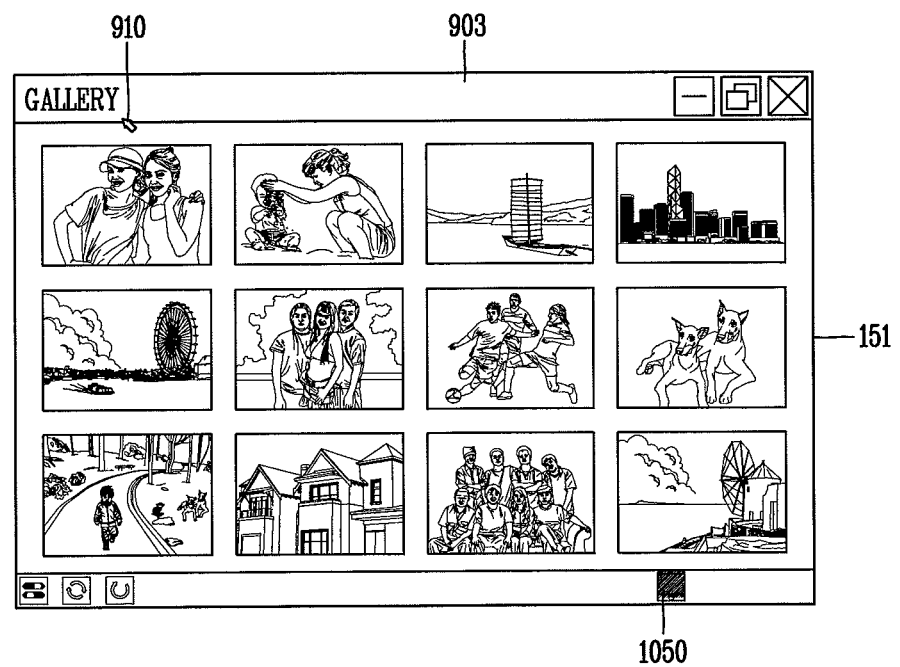

When the user performs a double short touch input to one region of the background screen (a position at which the object is not displayed) when the second icon 920b is pointed by the pointer 910″, the execution screen 903 of a gallery application corresponding to the second icon 920b is displayed on the display unit 151 as illustrated in FIG. 10F.

In addition, in order to change the touch input window 500 displayed in the entire region of the display unit 151 to an original size, the user can make a touch to a touch input window icon or specific key to allow the touch input window 500 to disappear and then reapply a signal for requesting the touch input window, thereby displaying the touch input window having a predetermined size at the previous location of the display unit 151.

In addition, a virtual touch input window displayed on the screen according to an embodiment of the present invention can be implemented to display an input device at a user's desired location and desired size, thereby minimizing the limitation of an input and output to the screen as well as minimizing an inconvenience in which an object to be pointed is hidden by the user's hand or stylus pen.

Hereinafter, examples successively performed even when a function corresponding to a direct touch input and a function corresponding to an indirect touch input pass through the touch input window according to the attribute of a touch input window displayed in a transparent manner on the display unit 151 will be described.

Figure 11A:
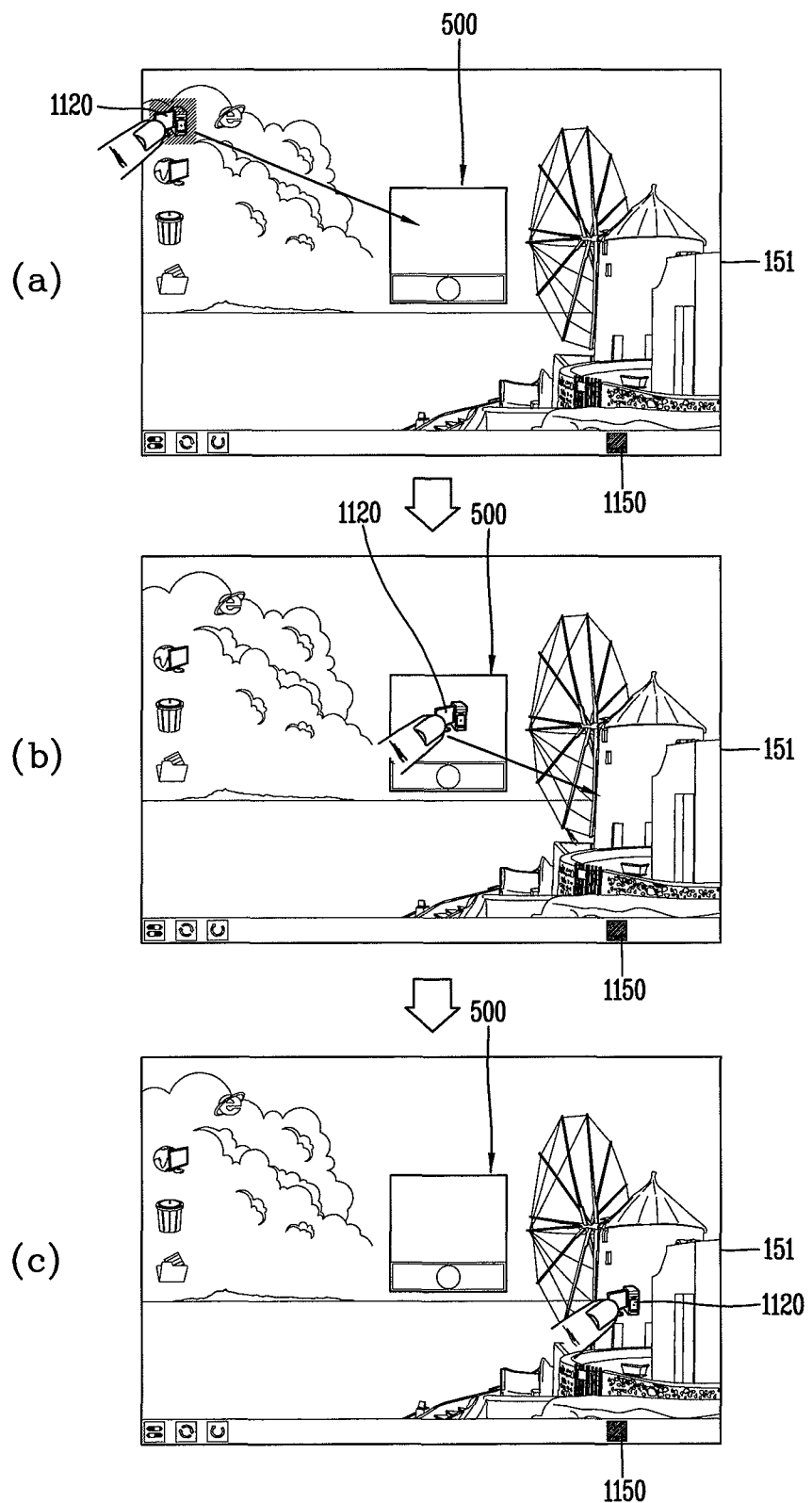
FIGS. 11A through 11C are conceptual views illustrating a method of maintaining a direct touch input and a pointer-based input, and a method of adding an interface environment that is convenient for the user to a virtual input device according to an embodiment of the present invention.
Figure 11B:
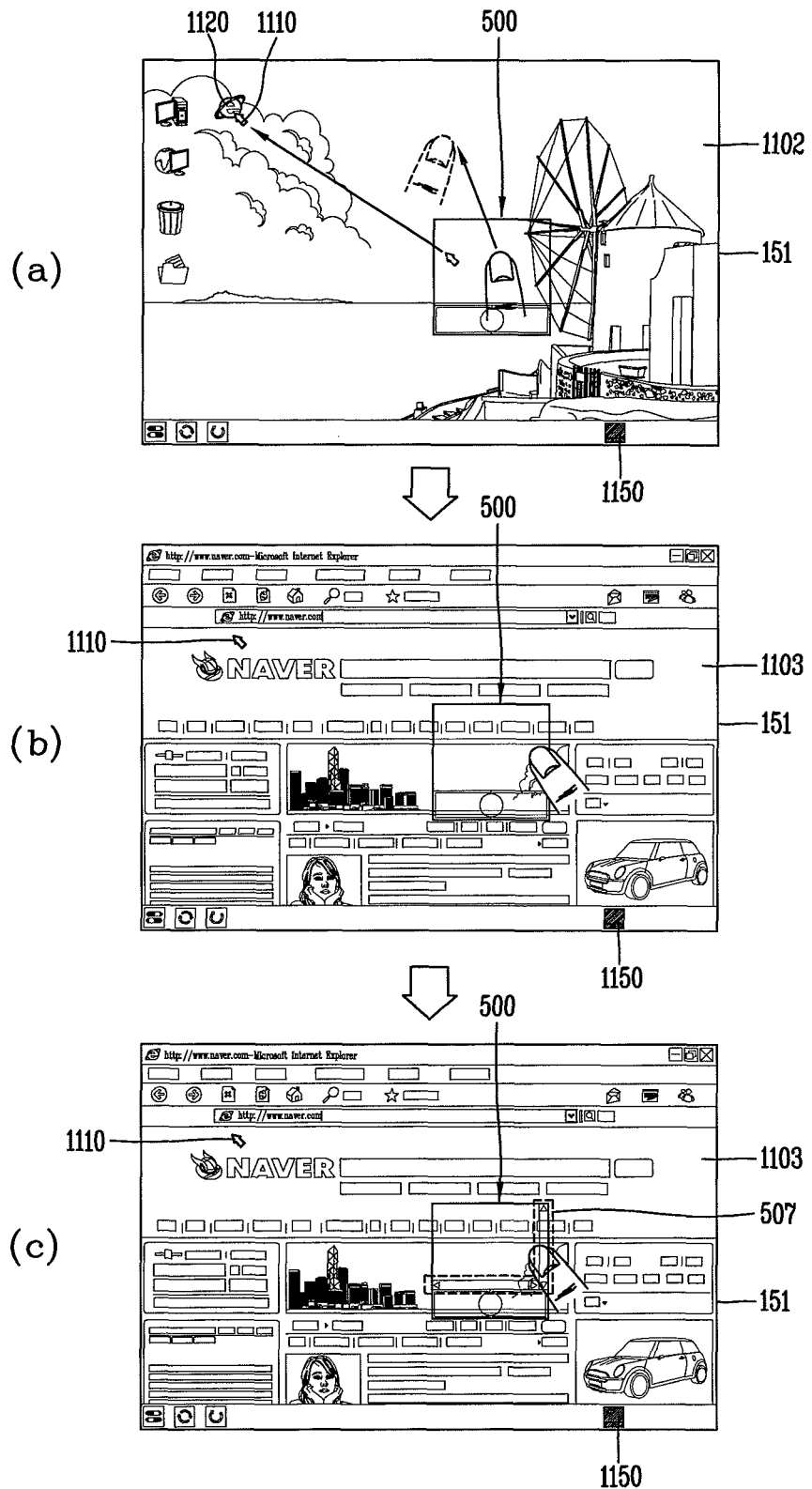
Figure 11C:
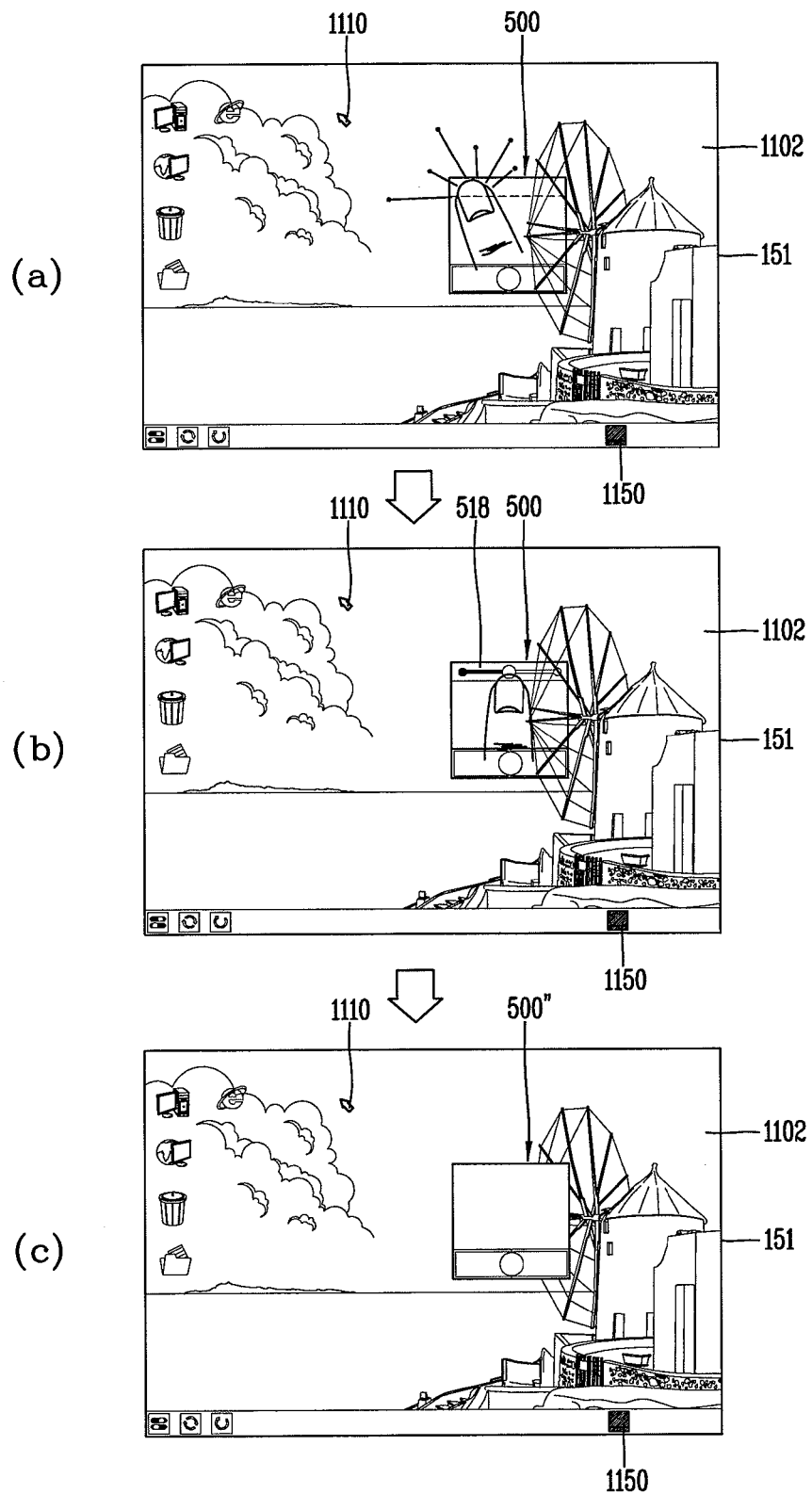

FIGS. 11A through 11C are conceptual views illustrating a method of maintaining a direct touch input and an indirect touch input based on a pointer regardless of the touch input window 500, and a method of adding an interface environment that is convenient for the user to a virtual input device according to an embodiment of the present invention.

Even when the touch input window 500 having a predetermined transparency is displayed on the display unit 151, the controller 180 maintains the display status of a pointer moving along a first touch even when the first touch started from a region displayed with the displayed touch input window 500 moves out of a region displayed with the touch input window 500. In other words, a direct touch input is not hindered by the touch input window 500 until the first touch is terminated.

Furthermore, even when a second touch applied to an object displayed in a region out of the displayed touch input window 500 enters a region displayed with the touch input window, the controller 180 maintains the display status of the object moving along the second touch. Also, when the second touch passes through the touch input window, the object moving along the second touch is also displayed to pass through the touch input window. In other words, the input and output are not limited by the touch input window 500 until the second touch is terminated.

For example, referring to FIG. 11A, as the user performs a direct touch input to a specific icon 1120 when the touch input window 500 is displayed on the screen as illustrated in FIG. 11A(a), and then drags it to a region displayed within the touch input window 500, the icon 1120 is displayed within the touch input window 500 as illustrated in FIG. 11A(b). In addition, as the user continuously performs a drag while maintaining the touch applied to the icon 1120, the icon 1120 passes through the touch input window 500 to be located at a position at which the touch is terminated. That is, the effect of the touch input window is nullified while maintaining a direct touch input, thereby sufficiently reflecting the attribute of the touch input window displayed in a transparent manner and the user's intention desired to perform the direction touch input.

Furthermore, referring to FIG. 11B, even when a touch applied to the touch input window 500 to move the touch input window 500, the pointer 1110 is moved and displayed as much as the same as the drag length or as a length in proportion thereto. In other words, it is continuously maintained even when a pointer-based indirect touch input gets out of the touch input window. However, subsequent to terminating a touch input out of the touch input window 500, a touch within the touch input window should be performed again to recognize it as a pointer-based indirect touch input.

In addition, in order that the user more clearly recognizes a region displayed with touch input window, namely, to more clearly know a display as an input device, there is a situation where a predetermined transparency is adjusted or other objects should be blocked not to be shown in a transparent manner.

In addition, the controller 180 can display an indicator icon for adjusting the transparency of the touch input window in response to a touch input being applied to a predetermined region of the displayed touch input window. Then, the controller 180 can adjust the transparency of the touch input window according to the manipulation of the indicator icon.

For example, when the user makes a long touch to an upper end region of the touch input window 500 as illustrated in FIG. 11C(a), an indicator icon 518 for adjusting the transparency is displayed in the upper end region of the touch input window 500 as illustrated in FIG. 11 C(b). As the user drags a moving indicator contained in the indicator icon 518 in one direction, the transparency of the touch input window 500 is decreased (or increased) as illustrated in FIG. 11C(c). Accordingly, the background screen or objects shown at a rear side of the touch input window 500 is not shown (or more clearly shown).

In addition, an interface that is convenient for the user can be further added to within the touch input window according to the type of execution screen displayed at a position at which the pointer is currently located. For example, the controller 180 can display at least one control key associated with the screen displayed on the display unit 151 within the touch input window in response to a predetermined touch being applied to the displayed touch input window.

Referring to FIG. 11B(b) and (c), when the user makes a long touch to one region, for example, a right boundary region, of the touch input window, when a web page screen 1103 is displayed at a position located with the pointer, a scroll bar 507 for scrolling the web page screen 1103 is displayed. In addition, a touch to a region displayed with the scroll bar 507 is recognized as a direct touch input. As a result, when the user has to frequently perform a pointer-based indirect touch input and a scroll function of the web page screen 1103 in an alternate manner, the user's hand or stylus pen can move only within the touch input window, thereby providing an interface environment that is convenient for the user.

Figure 12:
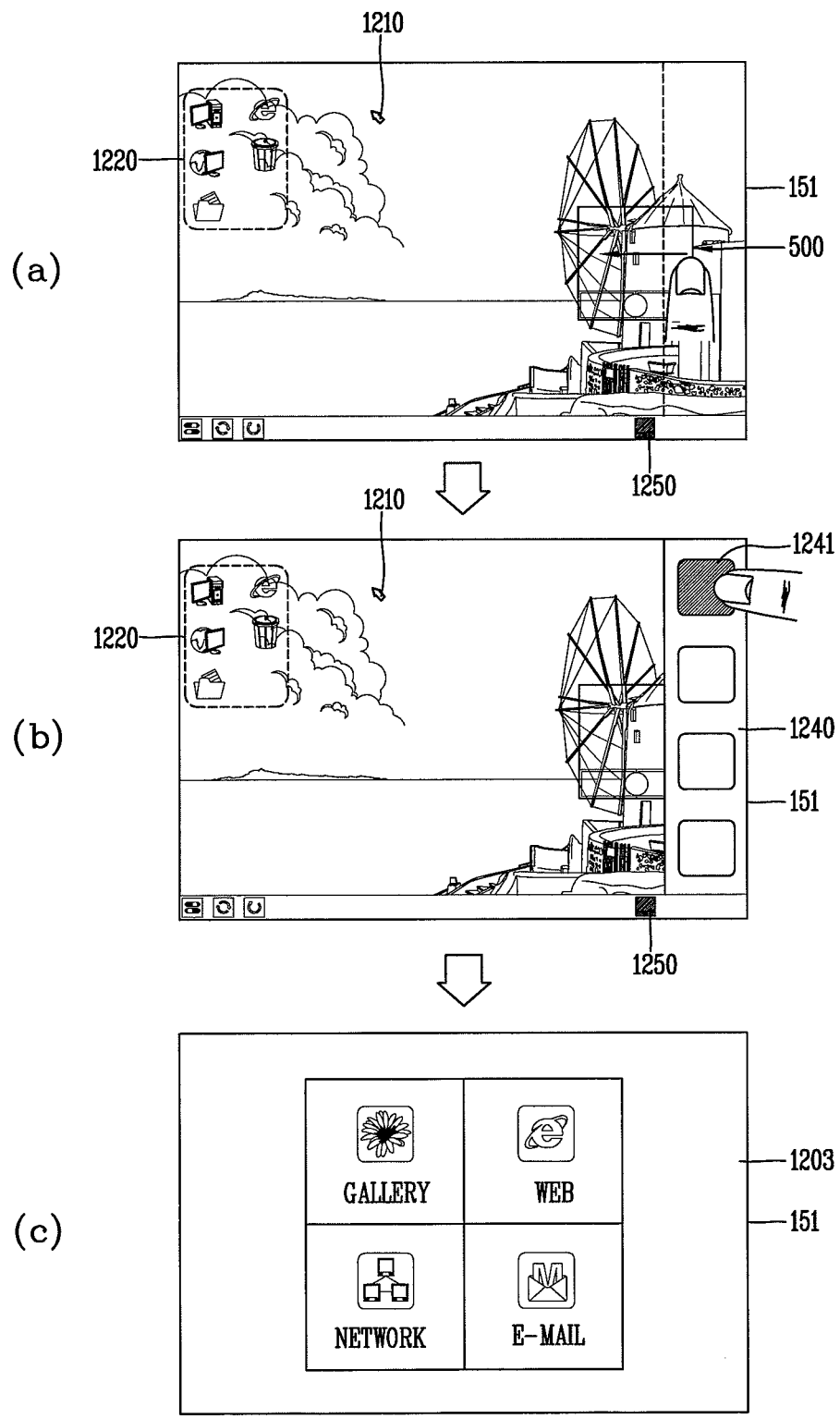
FIG. 12 is a conceptual view illustrating a method of deactivating a virtual input device based on a specific application according to an embodiment of the present invention.

In addition, there is a preferable situation where only a user's direct touch input is performed according to a specific application. Hereinafter, a method of deactivating a virtual input device according to a specific application will be described with reference to FIG. 12.

Upon receiving a request of the touch input window, 500 the touch input window 500 having a predetermined transparency is displayed on the display unit 151. Thus, when a window screen corresponding to the execution of a predetermined first application is popped up while displaying the touch input window 500, the controller 180 can deactivate a touch input to a region overlapped with the popped up window screen on the touch input window 500. Otherwise, the controller 180 can control the displayed touch input window to disappear from the screen.

In addition, the controller 180 can determine whether or not to display the touch input window 500 and whether or not to activate a touch input to a region overlapped with the window screen in the touch input window 500. For example, for a predetermined application, the controller 180 can process a predetermined region or a predetermined object having a higher priority than that of the touch input window, a touch input to a portion overlapped with the touch input window to be ineffective. Otherwise, for an application, region or object having the highest priority, the controller 180 can allow the displayed touch input window to disappear from the screen or ignore a request signal of the touch input window.

For example, referring to FIG. 12(a), when the user makes a flicking touch to the right boundary region in the direction of the center of the screen when the touch input window 500 is displayed on the right boundary region of the display unit 151, a menu region 1240 containing a plurality of preset icons is displayed in the relevant region. In addition, a partial region of the touch input window 500 overlapped with the menu region 1240 is processed to disappear or for a touch input to be ineffective as illustrated in FIG. 12(b).

However, a touch input in a partial region of the touch input window 500 that is not overlapped with the menu region 1240 is processed to be a still effective indirect touch input. Meanwhile, when a specific icon 1241 is selected from the menu region 1240 and an application corresponding to the relevant icon 1241 is set to perform only a direct touch input, the touch input window 500 disappears from the screen as illustrated in FIG. 12(c).

As described above, according to an image display device and a control method thereof in accordance with the embodiments of the present invention, an input device associated with the image display device can be displayed on the screen while not hiding the other objects, thereby overcoming the limitation of a physical space due to the input device. Furthermore, it is possible to minimize the limitation of an input and output to the screen, and avoid inconvenience in which an object to be pointed by the user's hand or stylus pen is hidden.

In addition, an input device can be displayed at a user's desired location and desired size, thereby minimizing the limitation of an input and output to the screen as well as avoiding an inconvenience in which an object to be pointed is hidden by the user's hand or stylus pen. Furthermore, a pointer-based input for the control of a small object displayed on the screen and a direct touch input for the control of the other objects can be performed, thereby providing a convenience in which the user can select a more suitable interface environment according to the size of an object to be controlled.

Moreover, according to an embodiment of the present invention, the foregoing method may be implemented as codes readable by a processor on a medium written by the program. Examples of the processor-readable media may include ROM, RAM, CD-ROM, magnetic tape, floppy disk, and optical data storage device, and the like, and also include a device implemented via a carrier wave (for example, transmission via the Internet). The configurations and methods according to the above-described embodiments will not be applicable in a limited way to the foregoing image display device and control method thereof, and all or part of each embodiment may be selectively combined and configured to make various modifications thereto.

What is claimed is:

1. An image display device; comprising:
   a touchscreen display configured to display information; and
   a controller configured to:
   receive a request to display a touch input window on the touchscreen display,
   display the touch input window with a predetermined transparency while maintaining the information displayed on the touchscreen display based on the received request, said touch input window including a pad region for controlling a pointer displayed on the touchscreen display,
   move the pointer displayed on the touchscreen display in accordance with a touch movement on the pad region of the touch input window,
   select and execute an application corresponding to a display object displayed on the touchscreen display when the pointer is displayed on the display object and an execute command is received, and
   select and execute the application corresponding to the display object when the pointer is not displayed on the display object and a touch direct input of the display object is received.

2. The image display device of claim 1, wherein the touch input window further includes:
   first and second touch click areas to perform additional functions assigned to the first and second touch click areas; and
   a preset region to perform moving of the touch input window,
   the controller is further configured to move the touch input window corresponding to a touch applied to the preset region of the touch input window.

3. The image display device of claim 2, wherein the controller is further configured to set predefined boundaries of where the touch input window can be displayed on the touchscreen display, and prevent the touch input window from being moved out of the predefined boundaries.

4. The image display device of claim 2, wherein the preset region includes first and second modes, and
   wherein the controller is further configured to:
   stop displaying the touch input window and the pointer when the preset region is in the first mode and a touch action outside of the touch input window is received, and
   continue displaying the touch input window and the pointer when the preset region is in the second mode and the touch action outside of the touch input window is received.

5. The image display device of claim 1, wherein the controller is further configured to display the touch input window and the pointer at locations that have been displayed for a previously received request to display the touch input window.

6. The image display device of claim 2, wherein the first click area of the touch input window executes a double click function for the display object pointed at by the pointer, and the second click area of the touch input window displays a menu for executing at least one function associated with the display object.

7. The image display device of claim 6, wherein the controller is further configured to display a display in a region to which a start point of the first touch input is applied between the first and second click areas, which is visually distinguished from the other region.

8. The image display device of claim 2, wherein a touch action from the first click area to an outside of the first click area is determined as selection of the first click area, and
   a touch action from the second click area to an outside of the second click area is determined as selection of the second click area.

9. The image display device of claim 6, wherein the controller is further configured to:
   display the first and second click areas to be separated from each other at a preset location of the touchscreen display upon receiving a first input signal,
   control to display a pointer moving along the movement of the drag touch input to be displayed in one region of the touchscreen display in response to a drag touch input being sensed in at least one of the first and second click areas, and
   control the touchscreen display to contain the first and second click areas within one touch input window upon receiving a second input signal.

10. The image display device of claim 1, further comprising:
    a sensing unit configured to sense an orientation of the image display device,
    wherein the controller is further configured to display an orientation of the touch input window to match the sensed orientation of the image display device.

11. The image display device of claim 1, wherein the controller is further configured to control to switch a function corresponding to the first touch input executed in the first and second click areas based on setting of the image display device.

12. The image display device of claim 1, wherein the controller is further configured to change a size of the touch input window based on a touch and resizing command.

13. The image display device of claim 12, wherein when the size of the touch input window is a full screen of the touchscreen display,
    the controller is further configured to move the pointer to a location of another touch on the touchscreen display, and execute an application corresponding to another display object at the location of said another touch in response to an execute command being received.

14. The image display device of claim 1, wherein the controller is further configured to:
    when a touch and drag at a first position inside of the touch input window and to a second position outside of the touch input window is received,
    move the pointer displayed on the touchscreen display in accordance with the received touch and drag, and
    when a touch and drag of an object at a first position outside of the touch input window, through the touch input window, and to a second position outside of the touch input window is received, move the object from the first position to the second position, and maintain the display status of the object moving along the touch and drag of the object even when the touch and drag applied to the object displayed outside of the touch input window enters to the touch input window.

15. The image display device of claim 1, wherein the controller is further configured to:
  display an indicator icon for adjusting the transparency of the touch input window, and
  adjust the transparency of the touch input window according to a manipulation of the indicator icon.

16. The image display device of claim 1, wherein the controller is further configured to display at least one control key associated with the information displayed on the touchscreen display within the touch input window in response to a preset touch being applied to the touch input window.

17. The image display device of claim 1, wherein the controller is further configured to:
  display a pop up at least partially over the touch input window, and
  selectively deactivate a touch input to a region of the touch input window overlapped with the pop up window.

18. The image display device of claim 1, wherein the controller is further configured to output at least one of a sound, a vibration and a highlighting effect corresponding to a touch of the touch input window.

19. A method of controlling an image display device, the method comprising:
  displaying, via a touchscreen display, information;
  receiving, via a controller, a request to display a touch input window on the touchscreen display;
  displaying, via the touchscreen display, the touch input window with a predetermined transparency while maintaining the information displayed on the touchscreen display based on the received request, said touch input window including a pad region for controlling a pointer displayed on the touchscreen display;
  moving, via the controller, the pointer displayed on the touchscreen display in accordance with a touch movement on the pad region of the touch input window;
  selecting and executing, via the controller, an application corresponding to a display object displayed on the touchscreen display when the pointer is displayed on the display object and an execute command is received; and
  disappearing the point from the touchscreen display, and selecting and executing, via the controller, the application corresponding to the display object when a touch direct input of the display object is received.

20. The method of claim 19, further comprising:
receiving a touch and drag at a first position inside of the touch input window and to a second position outside of the touch input window;
moving the pointer displayed on the touchscreen display in accordance with the received touch and drag;
receiving a touch and drag of an object at a first position outside of the touch input window, through the touch input window, and to a second position outside of the touch input window is received;
moving the object from the first position to the second position and maintaining the display status of the object moving along the touch and drag of the object even when the touch and drag applied to the object displayed outside of the touch input window enters to the touch input window.

* * * * *